(12) United States Patent
Schiffres et al.

(10) Patent No.: US 12,220,874 B2
(45) Date of Patent: Feb. 11, 2025

(54) ENHANCED NON-DESTRUCTIVE TESTING IN DIRECTED ENERGY MATERIAL PROCESSING

(71) Applicant: The Research Foundation for the State University of New York, Binghamton, NY (US)

(72) Inventors: Scott N. Schiffres, Vestal, NY (US); Matthias Daeumer, Pleasanton, CA (US); Jacob C. Simmons, Copeke, NY (US); Arad Azizi, Karaj (IR)

(73) Assignee: The Research Foundation for The State University of New York, Binghamton, NY (US)

( * ) Notice: Subject to any disclaimer, the term of this patent is extended or adjusted under 35 U.S.C. 154(b) by 0 days.

(21) Appl. No.: 18/200,492

(22) Filed: May 22, 2023

(65) Prior Publication Data

US 2024/0165885 A1    May 23, 2024

Related U.S. Application Data

(63) Continuation of application No. 16/852,290, filed on Apr. 17, 2020, now Pat. No. 11,654,635.
(Continued)

(51) Int. Cl.
*B29C 64/393* (2017.01)
*B22F 10/20* (2021.01)
(Continued)

(52) U.S. Cl.
CPC ............ *B29C 64/393* (2017.08); *B22F 10/20* (2021.01); *B22F 10/38* (2021.01); *B29C 64/153* (2017.08);
(Continued)

(58) Field of Classification Search
CPC .... G01N 29/348; G01N 29/46; G01N 29/041; G01N 29/2418; G01N 29/346; G01N 29/4409; G01N 21/1717; G01N 2021/1731; G01N 25/18; B29C 64/393; B29C 64/153; B22F 10/28; B22F 10/20; B22F 10/38; B22F 10/36; B22F 10/30; B22F 12/90; B22F 2999/00; B22F 2203/03;
(Continued)

(56) References Cited

U.S. PATENT DOCUMENTS

2015/0125335 A1* 5/2015 Bruck .................... B22F 10/37
    419/26
2017/0120337 A1* 5/2017 Kanko ............... B23K 15/0013
(Continued)

*Primary Examiner* — Sang H Nguyen
(74) *Attorney, Agent, or Firm* — Hoffberg & Associates; Steven M. Hoffberg

(57) ABSTRACT

A system and method for measuring characteristics, comprising: a directed energy source having an energy output which changes over time, incident on an object undergoing additive manufacturing; a sensor configured to measure a dynamic thermal response of at least a portion of the object undergoing additive manufacturing proximate to a directed location of the directed energy source over time with respect distance from the directed location; and at least one processor, configured to analyze the measured dynamic thermal response to determine presence of a manufacturing defect in the object undergoing additive manufacturing, before completion of manufacturing.

20 Claims, 19 Drawing Sheets

Related U.S. Application Data

(60) Provisional application No. 62/836,064, filed on Apr. 18, 2019.

(51) Int. Cl.

| | |
|---|---|
| *B22F 10/38* | (2021.01) |
| *B29C 64/153* | (2017.01) |
| *G01N 21/17* | (2006.01) |
| *G01N 29/04* | (2006.01) |
| *G01N 29/24* | (2006.01) |
| *G01N 29/34* | (2006.01) |
| *G01N 29/44* | (2006.01) |
| *G01N 29/46* | (2006.01) |
| *G06N 20/00* | (2019.01) |
| *B22F 10/25* | (2021.01) |
| *B22F 10/28* | (2021.01) |
| *B22F 10/30* | (2021.01) |
| *B22F 10/36* | (2021.01) |
| *B22F 10/37* | (2021.01) |
| *B22F 10/50* | (2021.01) |
| *B22F 10/73* | (2021.01) |
| *B22F 12/90* | (2021.01) |
| *B33Y 10/00* | (2015.01) |
| *B33Y 50/02* | (2015.01) |
| *G01N 25/18* | (2006.01) |

(52) U.S. Cl.
CPC ....... *G01N 21/1717* (2013.01); *G01N 29/041* (2013.01); *G01N 29/2418* (2013.01); *G01N 29/346* (2013.01); *G01N 29/4409* (2013.01); *G01N 29/46* (2013.01); *G06N 20/00* (2019.01); *B22F 10/25* (2021.01); *B22F 10/28* (2021.01); *B22F 10/30* (2021.01); *B22F 10/36* (2021.01); *B22F 10/37* (2021.01); *B22F 10/50* (2021.01); *B22F 10/73* (2021.01); *B22F 12/90* (2021.01); *B33Y 10/00* (2014.12); *B33Y 50/02* (2014.12); *G01N 2021/1731* (2013.01); *G01N 25/18* (2013.01)

(58) Field of Classification Search
CPC ........ G06N 20/00; B33Y 50/02; B33Y 10/00; Y02P 10/25
See application file for complete search history.

(56) References Cited

U.S. PATENT DOCUMENTS

| | | | |
|---|---|---|---|
| 2017/0165791 A1* | 6/2017 | Kamachi | B29C 64/295 |
| 2017/0326867 A1* | 11/2017 | Hartke | B29C 64/153 |
| 2017/0361405 A1* | 12/2017 | Renz | B23K 26/705 |
| 2018/0071987 A1* | 3/2018 | Tsumuraya | B29C 64/153 |
| 2018/0154484 A1* | 6/2018 | Hall | B23K 26/0604 |
| 2019/0009369 A1* | 1/2019 | Vorontsov | G02B 6/02052 |
| 2019/0039318 A1* | 2/2019 | Madigan | B33Y 50/02 |
| 2019/0134709 A1* | 5/2019 | Dave | B33Y 30/00 |

* cited by examiner

ENHANCED NON-DESTRUCTIVE TESTING IN DIRECTED ENERGY MATERIAL PROCESSING

CROSS REFERENCE TO RELATED APPLICATIONS

The present application is a Continuation of Ser. No. 16/852,290, filed Apr. 17, 2020, now U.S. Pat. No. 11,654,635, issued May 23, 2023, which is a Non-provisional of, and claims benefit of priority under 35 U.S.C. § 119(e) from, U.S. Provisional Patent Application No. 62/836,064 filed Apr. 18, 2019, the entirety of which is expressly incorporated herein by reference.

FIELD OF THE INVENTION

The present invention relates to the field of non-destructive testing of metal parts, and more particularly to non-destructive testing of selectively laser melting (SLM) or sintering additively manufactured metal parts.

BACKGROUND OF THE INVENTION

Thermal conductivity is highly sensitive to the nanostructure and microstructure of the materials through which the heat passes. However, non-destructive methods of assessing the heat transfer properties of laser sintered components remain insufficient or inefficient for many purposes.

There are various technologies describing additive in situ non-destructive testing for techniques that use coaxial thermography, total bed thermography, optical monitoring, and recoater vibration. [1]-[7]. No known technology can detect all types of defects.

While optical techniques can use image processing or reflectivity to determine the roughness of surfaces and can detect powder feed issues, they are at a loss to determine many critical physical properties of the printed part or powder, such as the thermal conductivity, powder size, and microstructure. Recoater vibration, another in situ monitoring technique, measures recoater acceleration during powder deposition. Recoater acceleration can detect part failures, like those that occur when critical overhang geometries warp severely, or it can detect grossly incorrect processing parameters (e.g., surface roughness or balling), but it fails to detect many defect types. [1], [8].

SUMMARY OF THE INVENTION

The present described invention allows for a reduction in failed prints in selective laser melting. While the invention has particular application to selective laser melting, it is also useful in any thermal processing method that provides a directed energy source, including laser welding, arc-welding, electron-beam additive, microwave-based manufacturing, whereby the heating source can be modulated to elicit a periodically oscillating thermal response. This periodic heating enables probing the thermal conductivity of the material. That is, the process itself produces stimuli or impulses, that make a dynamic response analysis possible, without otherwise perturbing or interrupting the manufacturing process.

In selective laser melting, the powder bed fusion laser is modulated to probe the surface thermal properties (FIG. 1A). The oscillating component of the laser heating generates thermal waves that propagate into the material (FIG. 1B). A combination of the phase difference between the heating waveform and the temperature oscillation and the amplitude of the temperature oscillation, as measured by blackbody radiation emitted, is used to extract the thermal conductivity of the various layers present, including that of a thin surface oxide and the metal layer below. [9]-[11]

The periodic infrared emission from the surface is used to sense the temperature oscillation of the surface, which is dictated by the thermal conductivity and thermal interfacial conductivities near to the surface. The average amplitude of the temperature oscillation indicates the DC temperature, yielding everything standard thermography can measure, while the additional periodic frequency-domain thermal response provides information that probes the thermal properties very near to the surface with a high signal-to-noise ratio.

For selective laser melting and similar directed energy powder-fusion-techniques, three different modes can be sensed: 1) powder sensing, 2) just-printed layer sensing, and 3) melt-pool-sensing. In an additional mode, this sensing information can be used in feed-forward control that modifies the laser processing conditions (e.g., laser power and scanning speed) based on the previously measured properties (e.g., powder properties and/or just-printed layer properties). It could also be used to identify a powder mis-feed and fix that issue before greater damage is done. In an additional operational mode, the laser power could be continuously varied based on the in-situ melt-pool properties measured via this periodically oscillating signal. A diagram depicting this process is shown in FIG. 2.

The temperature may be sensed with a photodiode or camera installed in-line with the laser melting beam. For instance, the temperature can be sensed by the light gathered by the f-theta or dynamic-focusing lens after the galvanometer system using a spectrally selective mirror (e.g., dichroic mirror) that separates the IR surface emission from the reflected laser beam.

In an alternative embodiment, a photodiode or an array of photodiodes are mounted in the chamber with selective filters that block the laser wavelength (e.g., laser wavelength bandblocks or dichroic mirrors). The photodiode signal that measures the infrared emissions is analyzed in the frequency domain. This can be done via a data acquisition system using software that does a Fourier transform, or a dedicated hardware device called a lock-in amplifier that accomplishes the same task and outputs amplitude and phase at the drive frequency or frequencies. Moreover, a multiple heat source system (e.g., selective laser melting tool with four lasers) can modulate each laser at different frequencies, so the thermal signal from each laser can be separated.

Low-frequency oscillations may be used to pick up the characteristic properties of the powder relevant for fusion (optical adsorption, substrate-powder interfacial conductance, powder size) (FIG. 3). Compared to existing scanning time-domain thermography, the following benefits of this technique stem from its operation in the frequency domain: 1) greater signal-to-noise ratio, 2) tunable depth sensitivity, 3) thermal property extraction, 4) minimal additional hardware, and 5) prevent thermal cross-talk between lasers.

The present technology is distinct from frequency domain and time-domain thermoreflectance for several reasons. The laser in the preferred embodiment serves two functions: to heat for material processing, and to interrogate. [12]-[14]. The preferred embodiment uses blackbody radiation to measure temperature instead of the thermoreflected signal. This technique can also measure powder properties and can extract powder properties relevant to metal additive manufacturing. The present technology encompasses a feedback and/or feedforward processing technique to control processing. The preferred embodiment also provides insight into the micro and nanostructure from the thermal properties, which conventional melt pool and thermography techniques do not do.

It is therefore an object to provide a system for measuring thermal characteristics, comprising: a directed energy source having an energy output which changes over time, incident on an object undergoing additive manufacturing; a sensor configured to measure a dynamic thermal response of at least a portion of the object undergoing additive manufacturing proximate to a directed location of the directed energy source over time with respect distance from the directed location; and at least one processor, configured to analyze the measured dynamic thermal response to determine presence of a manufacturing defect in the object undergoing additive manufacturing, before completion of manufacturing.

It is also an object to provide a computer readable medium having non-transitory instructions for controlling an additive manufacturing system having a directed energy source having an energy output which changes over time, incident on an object undergoing additive manufacturing, a sensor configured to measure a thermal property of the object undergoing additive manufacturing proximate to a directed location of the directed energy source; and at least one processor, the non-transitory instructions comprising instructions for: measuring a dynamic thermal response of at least the portion of the object undergoing additive manufacturing proximate to the directed location of the directed energy source over time with respect to distance from the directed location; and selectively dependent on the measuring a dynamic thermal response, at least one of: analyzing the measured dynamic thermal response to determine presence of a manufacturing defect in the object undergoing additive manufacturing, before completion of manufacturing; and feedback and/or feedforward controlling the directed energy source.

It is a further object to provide a method for measuring thermal characteristics, comprising: changing an energy output of a directed energy source over time, incident on an object undergoing additive manufacturing; measuring a dynamic thermal response of at least a portion of the object undergoing additive manufacturing proximate to a directed location of the directed energy source over time with respect to distance from the directed location; and analyzing the measured dynamic thermal response to determine presence of a manufacturing defect in the object undergoing additive manufacturing, before completion of manufacturing.

It is a further object to provide a system for measuring characteristics, comprising: a directed energy source having a modulated energy output, configured to be incident on an object undergoing additive manufacturing; a sensor configured to measure temporal characteristics dependent on the modulation of the energy output, of a thermal response of at least a portion of the object undergoing additive manufacturing proximate to a directed location of the directed energy source; and at least one processor, configured to analyze the measured temporal characteristics to determine presence of a manufacturing defect in the object undergoing additive manufacturing, before completion of manufacturing.

Another object provides a system for measuring characteristics, comprising: a periodically changing directed energy source having an energy output, incident on an object undergoing additive manufacturing; a sensor configured to measure a thermal response of at least a portion of the object undergoing additive manufacturing proximate to a directed location of the periodically changing directed energy source over time; and at least one processor, configured to perform a periodic signal analysis of the measured thermal response, to determine presence of a manufacturing defect in the object undergoing additive manufacturing, before completion of manufacturing.

A still further object provides a computer readable medium having non-transitory instructions for controlling an additive manufacturing system having a modulated directed energy source having an energy output, incident on an object undergoing additive manufacturing, a sensor configured to measure a temporal characteristics dependent on the modulation of the energy output on the object undergoing additive manufacturing; and at least one processor, the non-transitory instructions comprising instructions for: measuring temporal characteristics dependent on the modulation of the energy output, of a thermal response of at least a portion of the object undergoing additive manufacturing proximate to a directed location of the directed energy source; and selectively dependent on the measurement of a dynamic thermal response, at least one of: analyzing the measured temporal characteristics to determine presence of a manufacturing defect in the object undergoing additive manufacturing, before completion of manufacturing; feedback controlling the directed energy source; and feedforward controlling the directed energy source.

A further object provides a method for measuring characteristics, comprising: periodically changing an energy output of a directed energy source, incident on an object undergoing additive manufacturing; measuring a thermal response of at least a portion of the object undergoing additive manufacturing proximate to a directed location of the directed energy source over time; and analyzing the measured thermal response according to at least a periodic signal analysis algorithm executing on at least one processor, to determine presence of a manufacturing defect in the object undergoing additive manufacturing, before completion of manufacturing.

Another object provides a method for measuring characteristics, comprising: modulating an energy output of a directed energy source, incident on an object undergoing additive manufacturing; measuring temporal characteristics dependent on the modulation of the energy output, of a thermal response of at least a portion of the object undergoing additive manufacturing proximate to a directed location of the directed energy source; and analyzing the measured temporal characteristics to determine presence of a manufacturing defect in the object undergoing additive manufacturing, before completion of manufacturing.

The temporal characteristics may comprise a timeconstant, a phase delay, or a signal amplitude, for example.

The modulating of the energy output of a directed energy source, incident on the object undergoing additive manufacturing may comprise emitting modulated energy on the object at a respective location on the object over a plurality of cycles of modulation.

The modulating of the energy output of a directed energy source, incident on the object undergoing additive manufacturing may comprise emitting modulated energy on the object at overlapping and incrementally varying respective locations on the object over a plurality of cycles of modulation.

The modulating of the energy output of a directed energy source has a modulation period, and the energy output is incident on the object undergoing additive manufacturing may comprise at least two modulation periods for each respective location on the object.

The modulating of the energy output of the directed energy source may have a modulation period, and the energy output transforms a surface of the object undergoing additive manufacturing at a respective location, wherein the respective location is subject to energy output for at least two modulation periods.

The energy output of the directed energy source may have a spot size of about 10 µm-100 µm, which translates across a surface of the object at a rate of about 1-7 m/sec, and is modulated at a rate of between 10 kHz and 10 Mhz. The energy output of the directed energy source may have a spot size of about 100 µm, which translates across a surface of the object at a rate of about 1 m/sec, and is modulated at a rate of at least 20 kHz. The modulating may have a frequency of at least 10 kHz, at least 20 kHz, at least 50 kHz, at least 100 kHz, at least 500 kHz, at least 1 MHz, at least 5 MHz, or at least 10 MHz, for example.

The energy output of the directed energy source may be a light source that fuses a powder bed. The energy source can be stationary or moving. The modulation frequency spectrum can be selected so that the thermal penetration depths vary from 0.1 to 5 layer heights based on the solid part thermal properties. The modulating may have components comprising at least two frequencies differing by at least a ratio of 1.25. The modulating may have components comprising at least three frequencies within a bandwidth having an upper to lower frequency ratio of at least two. The modulating may have components comprising at least three frequencies within a bandwidth having an upper to lower frequency ratio of at least two. The modulating may have components defined by a direct sequence spread spectrum modulator. The modulating may have components comprising a chirp waveform.

The analyzing may comprise determining a depth of a defect beneath a surface of the object based on at least a modulation frequency. The analyzing may comprise performing a Fourier transform, a wavelet transform, a time-frequency domain transform, a hybrid time-frequency domain transform, or a Feldman [12]/Cahill [14] analysis of heat transfer in multilayered objects, for example.

The analyzing may comprise determining a defect based on a statistical norm, and/or a comparison with measured temporal characteristics dependent on the modulation of the energy output, of the thermal response of at least a portion of a known good object undergoing additive manufacturing proximate to the directed location of the directed energy source.

The analyzing may comprise performing a geometric model-based analysis of expected measured temporal characteristics dependent on the modulation of the energy output.

The analyzing may comprise detecting a set of non-deterministic defects in the object, and determining an identification signature based on the set of non-deterministic defects.

The method may further comprise authenticating an object based on a correspondence of a set of defects in the object to be authenticated with the authentication signature for the object to be authenticated. See, [15]

The method may further comprise adaptively learning processing conditions of the modulation of the energy output of the directed energy source, incident on the object undergoing additive manufacturing, that lead for formation of defects, and producing at least one output which predicts a future defect based on supplied processing conditions.

The additive manufacturing may comprise fusing a powder, wherein a portion of the powder is recycled, further comprising directing the energy output of the directed energy source on the powder; measuring temporal characteristics dependent on the modulation of the energy output of the powder; and analyzing a fitness of the powder for fusion based on the measured temporal characteristics.

The additive manufacturing may comprise fusing a powder, further comprising directing the energy output of the directed energy source on the powder; measuring temporal characteristics dependent on the modulation of the energy output of the powder; and analyzing the measured temporal characteristics to determine a set of optimal parameters for said directing to perform fusion of the powder.

The additive manufacturing may comprise fusing a powder, further comprising determining presence of at least one tracer in the powder, and in dependence on the presence of the tracer, determining an authenticity of the powder.

The additive manufacturing may comprise laser processing a powder, further comprising determining presence of a plurality of different tracer dyes in the powder, and in selectively in dependence on the presence of the plurality of tracer dyes in the powder, determining an authenticity of the powder.

The additive manufacturing may comprise laser processing a powder, further comprising determining an authenticity of the powder based on said analyzing, and selectively performing fusion of the powder by the energy output of a directed energy source in dependence on the determined authenticity.

The additive manufacturing may comprise processing a metal powder, further comprising determining an oxidation degree of the powder by at least the modulating, measuring and analyzing.

The additive manufacturing may comprise processing a metal powder, further comprising determining whether the powder is recycled by at least the modulating, measuring and analyzing steps.

The measuring may be responsive to surface and/or subsurface thermal properties of the object undergoing additive manufacturing.

The measuring may comprise determining a thermal infrared emission, or a periodic thermal infrared emission.

The measuring may comprise determining a thermoreflectance of the object undergoing additive manufacturing. The thermoreflectance may determine a temperature-dependent reflectance change of a surface of the object undergoing additive manufacturing, interrogated via a probe light source.

The method may further comprise modulating the energy output of a directed energy source of an additive manufacturing system over time by applying periodic energy pulses to a surface of the object undergoing additive manufacturing. The directed energy source may comprise a laser, e.g., an infrared laser.

The additive manufacturing system may be a selective laser melting system, a selective laser sintering system, an electron beam additive manufacturing system, a directed energy deposition additive manufacturing system, a laser welding system, or an arc welding system.

The additive manufacturing system may comprise a laser having an optical train, and wherein said measuring comprises determining an infrared emission of the object undergoing additive manufacturing through the optical train. The additive manufacturing system may comprise a pump laser at a first wavelength having an optical train, and wherein said measuring comprises determining an infrared emission of the object undergoing additive manufacturing at a second wavelength through the optical train. The optical train may comprise at least one wavelength selective filter.

The additive manufacturing system may comprise a laser which generates a continuous pulse over a period, and during the period, is modulated to interrogate properties of the object undergoing additive manufacturing in the frequency domain. The modulation may comprise a plurality of concurrent different frequencies.

The object undergoing additive manufacturing may be a metal, e.g., steel, e.g., stainless steel, or aluminum alloy.

The modulation of the energy output may be periodic, and the analyzing may comprise determining a periodic thermal response of the object undergoing additive manufacturing.

The modulating an energy output may comprise changing a location of the energy output of the directed energy source of an additive manufacturing system over time, to cause accretion of material on a surface of the object undergoing additive manufacturing.

The modulating an energy output may comprise annealing and/or preheating a surface of the object undergoing additive manufacturing.

The method may comprise modulating an energy output of the directed energy source to produce a pattern of energy output comprising a plurality of frequencies over a plurality of cycles of the plurality of frequencies, and/or producing a pattern of energy output comprising a plurality of energy output intervals.

The method may further comprise using the measured temporal characteristics to identify properties of an exposed deposited layer, a melt pool, and/or an additive manufacturing powder.

The method may further comprise adaptively controlling the additive manufacturing system selectively in dependence on said analyzing, to e.g., rework a portion of the object undergoing additive manufacturing selectively in dependence on said analyzing.

The method may further comprise modifying at least one of a power, a scanning speed, a directed energy size, an additive manufacturing material feed, based on said analyzing.

The object undergoing additive manufacturing may be manufactured as a series of layers, and the modifying is based on analyzing of a layer deposited prior to the layer being deposited.

The object undergoing additive manufacturing may be manufactured as a series of layers from a powder layer, and said modifying is based on analyzing of the powder layer.

The analyzing may estimate a surface roughness of the object undergoing additive manufacturing. The analyzing may estimate a melt pool thickness of the object undergoing additive manufacturing. The method may further comprise determining properties of the powder in the powder layer, based on the determined properties, identifying out-of-spec feedstock powder.

The analyzing may be selectively responsive to detecting a void space as manufacturing defect.

The analyzing may comprise comparing properties of the object undergoing additive manufacturing to a set of expected properties, and selectively determining the manufacturing defect based on a deviance of the properties of the object undergoing additive manufacturing from the set of expected properties The analyzing may determine a thermal conductivity of a surface of the object undergoing additive manufacturing. The analyzing may comprise determining an amplitude response and a thermal phase lag at a plurality of heating frequencies or rates. The analyzing may distinguish properties of a just-printed layer from properties of a previously printed layer.

The method may further comprise predicting a microstructure and nanostructure of the object undergoing additive manufacturing based on a thermal conductivity determined in said analyzing.

The method may further comprise determining correlation between the measured temporal characteristics associated with the microstructure and the nanostructure, and empirical observations of prior manufacturing defects in objects undergoing additive manufacturing.

The analyzing may determine at least one thermal property selected from the group consisting of thermal conductivity, density, specific heat, porosity, defect present, powder emissivity, powder conductance to substrate, powder diameter, powder surface coating, oxide layer, conductivity, powder surface coating thickness, powder coating specific heat, powder coating density, interfacial properties between grains, thickness of melt pool, latent heat of phase change, roughness, balling, and incomplete fusion.

The additive manufacturing system may receive an additive powder feedstock, wherein said analyzing comprises predicting powder processing properties.

The directed energy source may have a focusable heat source, the method further comprising defocusing the heat source to interrogate a larger area.

The analyzing may employ a combination of a phase of a frequency response of heating relative to the modulation of the energy output and an amplitude of the heating to interpret the temporal characteristics.

The analyzing may be responsive to a geometry of the object undergoing additive manufacturing. The geometry may comprise at least one of an overhang, a bridged feature, a cantilever, a support underneath, and distance from edge.

The additive manufacturing system may expose the object undergoing additive manufacturing to illumination by a plurality of different lasers modulated at different frequencies, the analyzing being frequency sensitive to avoid crosstalk in thermal measurements between different lasers.

The measuring may comprise sensing acoustic waves generated by expansion of air near a surface of the object, or expansion of the solid surface itself, undergoing additive manufacturing. The acoustic waves may be sensed through the air, and through the build platform.

It is also an object to provide a method for measuring characteristics, comprising: modulating an energy output of a directed energy source with at least two temporal components, a manufacturing temporal component and an interrogation temporal component, incident on an object undergoing additive manufacturing or an additive manufacturing material; measuring temporal characteristics, dependent on at least the interrogation temporal component modulation of the energy output, of a response of at least a portion of the object undergoing additive manufacturing or the additive manufacturing material proximate to a directed location of the directed energy source; and analyzing the measured temporal characteristics to predict presence of a manufacturing defect in the object undergoing additive manufacturing, during the additive manufacturing.

It is a further object to provide a system for measuring characteristics, comprising: a directed energy source having an energy output modulated with at least two distinct temporal components, comprising a manufacturing temporal component and an interrogation temporal component, incident on at least one of: an object undergoing additive manufacturing; or an additive manufacturing material for the additive manufacturing; a sensor configured to measure temporal characteristics dependent on at least the interrogation temporal component modulation of the energy output, of a response of at least a portion of the object undergoing additive manufacturing or the additive manufacturing material proximate to a directed location of the directed energy source; and at least one automated processor, configured to analyze the measured temporal characteristics to predict occurrence of a manufacturing defect in the object undergoing additive manufacturing, before completion of manufacturing.

It is also an object to provide a method for measuring characteristics, comprising: modulating an energy output of a directed energy source with at least two temporal components, a manufacturing temporal component and an interrogation temporal component, incident on an object undergoing additive manufacturing or an additive manufacturing material; measuring temporal characteristics, dependent on at least the interrogation temporal component modulation of the energy output, of a response of at least a portion of the object undergoing additive manufacturing or the additive manufacturing material proximate to a directed location of the directed energy source; and analyzing the measured temporal characteristics to predict presence of a manufacturing defect in the object undergoing additive manufacturing, during the additive manufacturing.

It is a still further object to provide a system for measuring characteristics, comprising: an automated control configured to: modulate an energy output of a directed energy source with at least two temporal components, a manufacturing temporal component and an interrogation temporal component, incident on an object undergoing additive manufacturing or an additive manufacturing material; measure temporal characteristics, dependent on at least the interrogation temporal component modulation of the energy output, of a response of at least a portion of the object undergoing additive manufacturing or the additive manufacturing material proximate to a directed location of the directed energy source; and at least one processor, configured to perform a periodic signal analysis of the measured temporal characteristics, to predict occurrence of a manufacturing defect in the object undergoing additive manufacturing, before completion of manufacturing.

The temporal characteristics may comprise at least one of a time constant, a phase delay, and a signal amplitude.

The measuring of temporal characteristics may comprise detecting at least one of a portion of scattered energy or a portion of radiated energy from a surface of the object undergoing additive manufacturing.

The modulating of the energy output of the directed energy source, incident on the object undergoing additive manufacturing comprises emitting modulated energy on the object at a respective location on the object over a plurality of cycles of modulation.

The energy output of the directed energy source may have a spot size of about 10μ-100 μm, which translates across a surface of the object at a rate of about 1-7 m/sec, and is modulated at a rate of between 10 kHz and 10 Mhz.

The modulating may have components comprising at least two frequencies differing by at least a ratio of 1.25.

The modulating may have components defined by at least one of a direct sequence spread spectrum modulator or a chirp modulator The analyzing may comprise determining a depth of a defect beneath a surface of the object.

The analyzing may comprise performing a transform selected from the group consisting of a Fourier transform, a wavelet transform, a time-frequency domain transform, and a hybrid time-frequency domain transform.

The analyzing may comprise performing a Cahill [12] analysis of heat transfer in multilayered objects.

The analyzing may comprise determining a defect based on a comparison with measured temporal characteristics dependent on the modulation of the energy output, of the thermal response of at least a portion of a known good object undergoing additive manufacturing proximate to the directed location of the directed energy source.

The method may further comprise adaptively learning processing conditions of the modulation of the energy output of the directed energy source, incident on the object undergoing additive manufacturing, that lead to formation of defects, and producing at least one output which predicts a future defect based on supplied processing conditions.

The additive manufacturing may comprise fusing the additive manufacturing material comprising a powder, further comprising directing the energy output of the directed energy source on the powder under non-fusion conditions; measuring temporal characteristics dependent on the modulation of the energy output of the powder; and analyzing at least one of a fitness of the powder, an authenticity of the powder, a recycling of the powder, and optimal processing conditions for fusion of the powder, based on the measured temporal characteristics.

The additive manufacturing may comprise fusing the additive manufacturing material comprising a powder, further comprising determining presence of at least one tracer or material signature in the powder, and in dependence on the presence of the tracer or material signature, determining an authenticity or optimal additive manufacturing conditions of the powder.

The analyzing may be selectively responsive to detecting a void space as manufacturing defect.

The additive manufacturing system may comprise at least one of a selective laser melting system, a selective laser sintering system, an electron beam additive manufacturing system, a directed energy deposition additive manufacturing system, a laser welding system, and an arc welding system.

The method may further comprise adaptively controlling the additive manufacturing system selectively in dependence on said analyzing.

The additive manufacturing system may comprise a laser at a first wavelength having an optical train for directing the energy output to the object or the additive manufacturing material, and wherein said measuring comprises determining at least one of an infrared emission, an optical scattering, and a thermoreflectance, of the object undergoing additive manufacturing or an additive manufacturing material at a second wavelength through the optical train.

The analyzing may be responsive to a geometry of the object undergoing additive manufacturing.

The measuring may comprise sensing acoustic waves in the object undergoing additive manufacturing.

DETAILED DESCRIPTION OF THE PREFERRED EMBODIMENTS

Selective laser melting (SLM) is an additive manufacturing process that allows solid metal or plastic parts to be produced from powder. Solid metal items are produced when a laser melts and fuses metal powder into a part through a layer-by-layer process. [16] In powder bed SLM, a thin layer of metal powder, generally around 20-40 μm thick, is deposited over the surface of the machine's build platform. [17] The laser is then scanned over a portion of that layer, melting the powder that the laser scans over into solid metal. An alternative method for depositing the powder is by spraying it through a nozzle onto the build area as the laser melts it, commonly referred to as direct metal deposition (DMD), which is categorized under direct energy deposition (DED). [18] After each layer, the process repeats.

The SLM process continues to become more accepted by companies looking for different options when creating prototypes or producing final products. Using SLM for prototyping can allow designers to go from a CAD model to a physical part in a matter of hours to days. The unique process of SLM also allows features to be incorporated into final products that would have been cost prohibitive or even impossible with traditional techniques, such as lattice structures to reduce weight or improve heat transfer. A famous example of the benefits of SLM is GE's Leap fuel nozzle. By using additive manufacturing, they were able to combine over 20 individual parts into a single part, thereby reducing the overall weight of the nozzle. [19] Another example of this process being used for final products is SpaceX additively manufacturing components of some of their rocket engines. [20] However, acceptance and testing of parts that vary build-to-build is a challenge faced by industry.

Figures 1A, 1B:
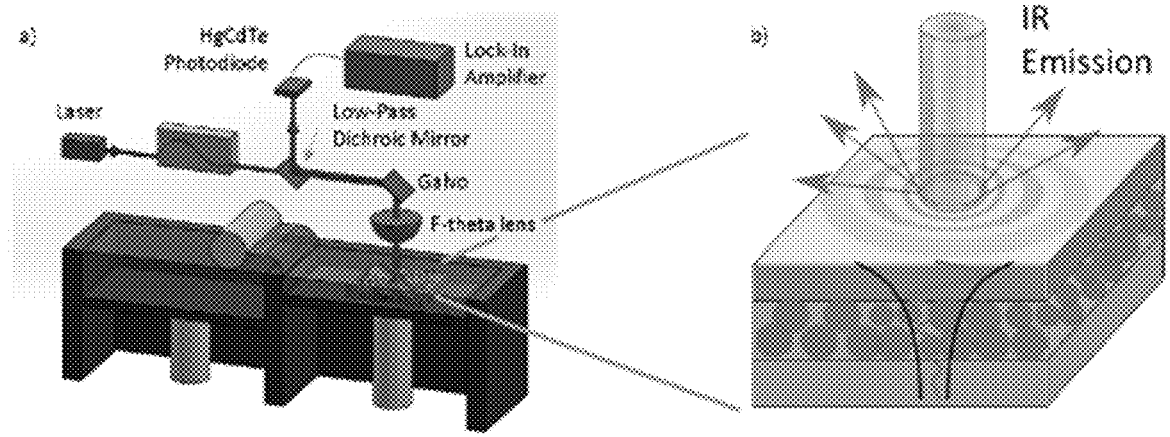
FIG. 1A show that addition of a small modulation to the laser power, leads to temperature oscillation waves propagating into the sample, which can be monitored with a photodiode inline to the laser optics (as pictured), or a non-inline photodiode in the build chamber.
FIG. 1B shows that the temperature oscillation at the surface is prescribed by the heating frequency and the thermal properties of the material.
Figure 2:
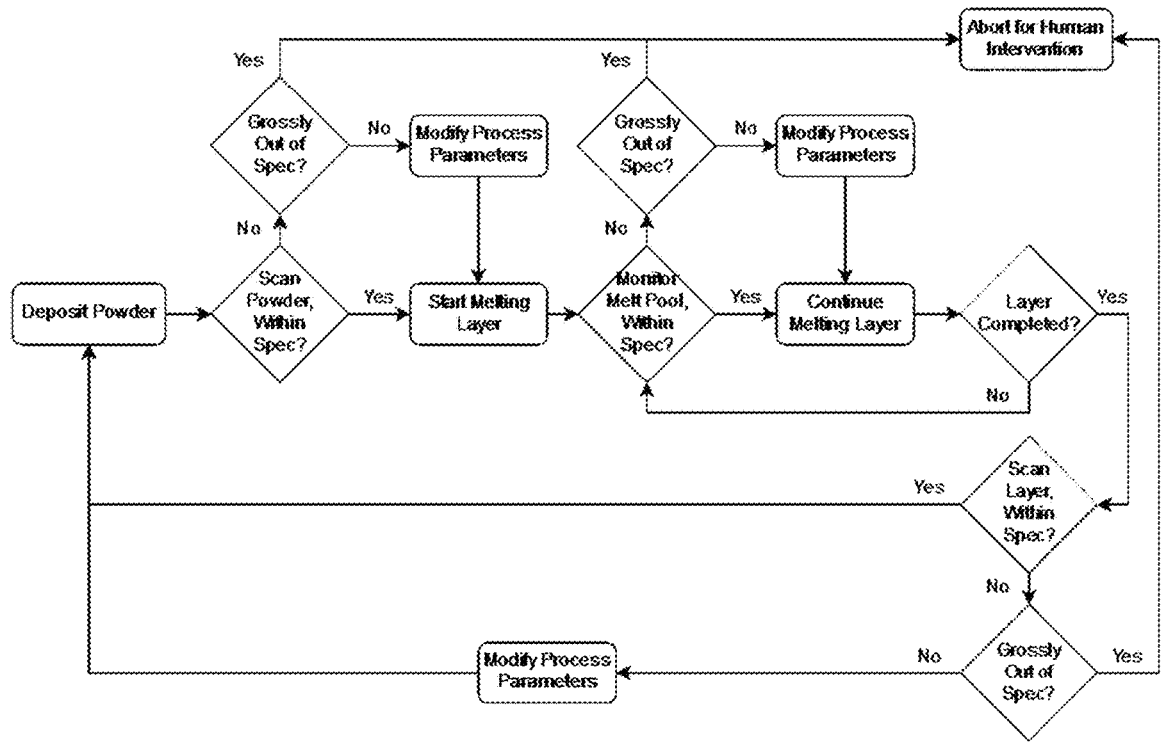
FIG. 2 shows a process diagram for non-destructive testing in the selective laser melting process, which can also be used in part with any combination of the powder check and/or the in-situ monitoring and/or the post-layer check with any of the sub-elements used in feed-forward or feed-back control.
Figure 3:
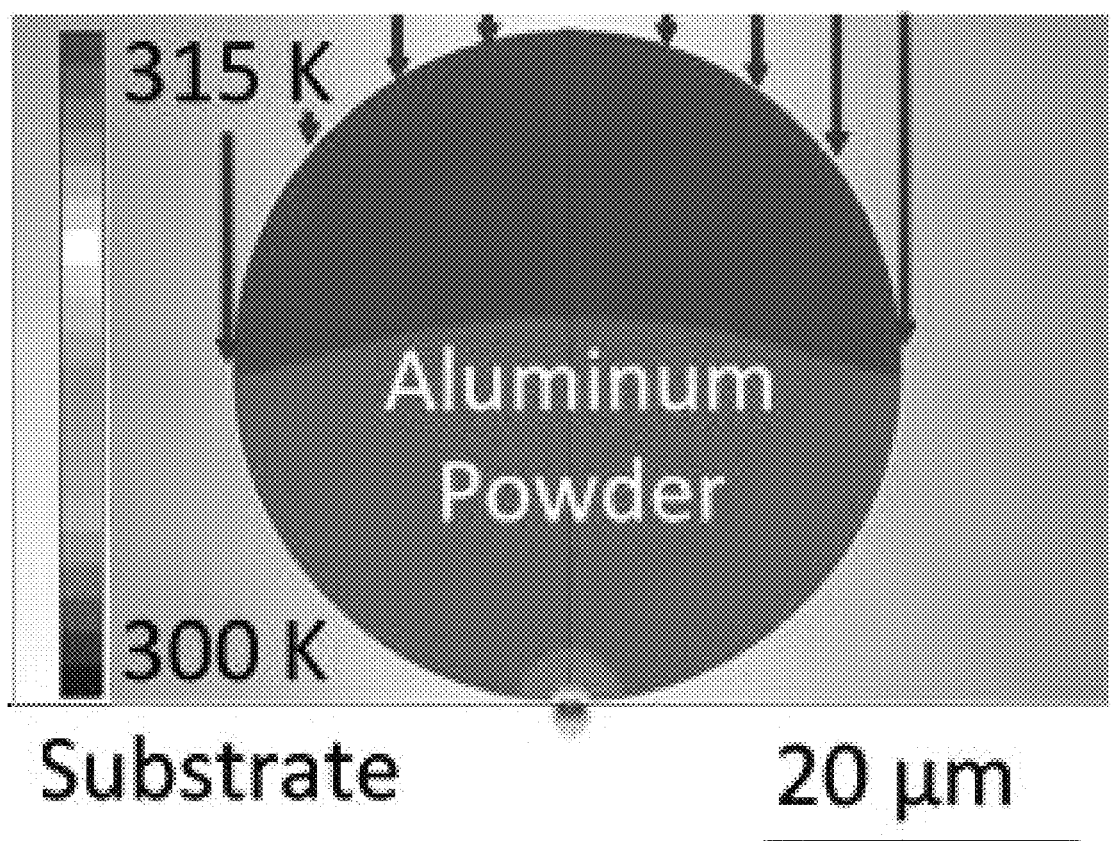
FIG. 3 shows a computational simulation of powder interrogation at 1 kHz.

This technology has several operating modes that relate to selective laser melting and similar directed energy powder-fusion-techniques: 1) powder sensing, 2) just-printed layer sensing, and 3) melt-pool-sensing. These sensing can be used in both feed-forward and feedback systems, and to detect failures and in some instances recover from them (FIG. 2). The subsequent detailed description of the technology will detail these modes of operation.

Investigating Metal Powders

Infrared thermal sensing, the current leader in non-destructive testing for additive processes, provides insufficient information to be fully relied upon. The present technology measures details beyond that of current techniques, like nano- and microstructure from thermal properties, which inform feed-forward or feedback additive control. While infrared thermography is currently the leader for defect detection, it has inaccuracy issues with temperature sensing due to uncertainty and variability in emissivity, viewing angle, transparency of the air due to dust generated by processing.

The present technology is superior because it relies on a dynamic stimulus, and therefore is capable of analyzing characteristic time delays, impulse response, and the like, to supplement static signal analysis. The present technology, for example, exploits a periodic signal and can use phase deviation, which is much less insensitive to emissivity of the surface, angles to the detector, distance to the detector, airborne scattering, and surface roughness than non-contact optical thermal sensing.

The present technology fills an identified gap as it monitors print quality at the macro-level and at the micro- and nanostructural level. In the invention, the laser preferably has at least two temporal components, one that is for manufacturing (e.g., changing with geometry), and one that is for interrogation of the additively manufactured part or additively manufactured materials. In many implementations, the laser is driven with both a DC and an AC component (e.g., 200+20 $\sin(2\pi)$ Watts), the thermal response signal is a superposition of the conventional thermography signal and the frequency-domain thermography signal. Notably, this means that the DC component of the thermography signal is identical to conventional thermography, while additional information is obtained from the interrogation temporal component. Furthermore, multiple AC frequencies can be probed simultaneously, providing information from different depths at the same time. In the case of interrogating the powder without melting, the process has a null manufacturing component, and only interrogates the powder.

Many lock-in amplifiers (e.g., Zurich Instruments MLFI) can measure multiple frequencies simultaneously. For systems with multiple directed energy sources, modulating each source at different set of frequencies can prevent thermal cross-talk. This technique provides temperature information, as with standard thermography, as well as the thermal conductivity of solids and powders, which yields valuable insights into the micro- and nanostructure of the printed parts.

The present technology also provides information on the metal powder properties. Powder size, powder oxide shell, and core metal properties may all affect the resulting micro- and nanostructure of the printed part and the optimal processing parameters. This technique is only sensitive to the thermal properties within the thermal wave penetration depth ($\sqrt{\alpha/f}$).[12], [21] At higher frequencies, the thermal penetration depth will be only fractions of the diameter, thus enabling measurement of the core metal, the oxide, the core thermal conductivity and oxide thickness. At sufficiently high frequencies, the thermal wave only propagates a few microns from the outside skin of the powder, hence probing the metal core thermal conductivity and oxide thickness. An analytical or semi-empirical model may be used to interpret the periodic temperature oscillations and the phase lag between heating and the temperature response. The thermal model assumes, for example, a thermal conductivity for the oxide and yields the oxide thickness and metal thermal conductivity.

At low heating frequencies ($D < \sqrt{\alpha/f}$), the rapid temperature rise can be approximated to first order using lumped capacitance modeling to estimate the quantity $6\varepsilon q''_s/\rho c D$, where $\varepsilon$ is the emissivity and absorptivity at the laser wavelength, $q''_s$ is the laser fluence, p is the density of the metal, c is the specific heat of the metal, and D is the diameter of the metal powder. In a limiting case relevant quantities can be derived using a lumped capacitance model for heat transfer during laser irradiation, $$\frac{dT}{dt} = \frac{6\varepsilon q''_s}{\rho c D}\left(1 - \frac{h\Delta T}{\varepsilon q''_s}\right),$$

where the term $$\frac{h\Delta T}{\varepsilon q''_s}$$

can be neglected during laser irradiation because $\varepsilon q''_s \gg h\Delta T$. This technique assumes operating at low frequencies without melting. Deviations from normal can be sensed by the difference in the phase lag between the temperature response and the periodic heating, where tolerances in phase deviation can be determined either by modeling, semi-empirical methods, simulations, or some combination of these. In certain cases, certain deviations can be handled by modifying the processing conditions, while significantly different cannot be handled by tuning properties (e.g., wrong powder thermal conductivity indicates powder contamination or mis-identification).

Knowing the metal powder properties enables adjustments to be made to the process parameters to improve the final print quality. This may be accomplished by scanning the powder before the start of the print and optimizing process parameters based on one scan, or scanning the powder for each layer before melting to determine the makeup of the powder in that layer. By knowing the makeup of the powder in a specific layer, the process parameters may be tuned layer-by-layer to optimize parameters previously determined from theory or empirical observations. For instance, different exposures are desirable for different structures (overhang vs. no overhang). By measuring the thermal conductivity, versus depth, the properties can be tuned based on the thermal response, rather than pre-planned at the printing stage.

Figure 4:
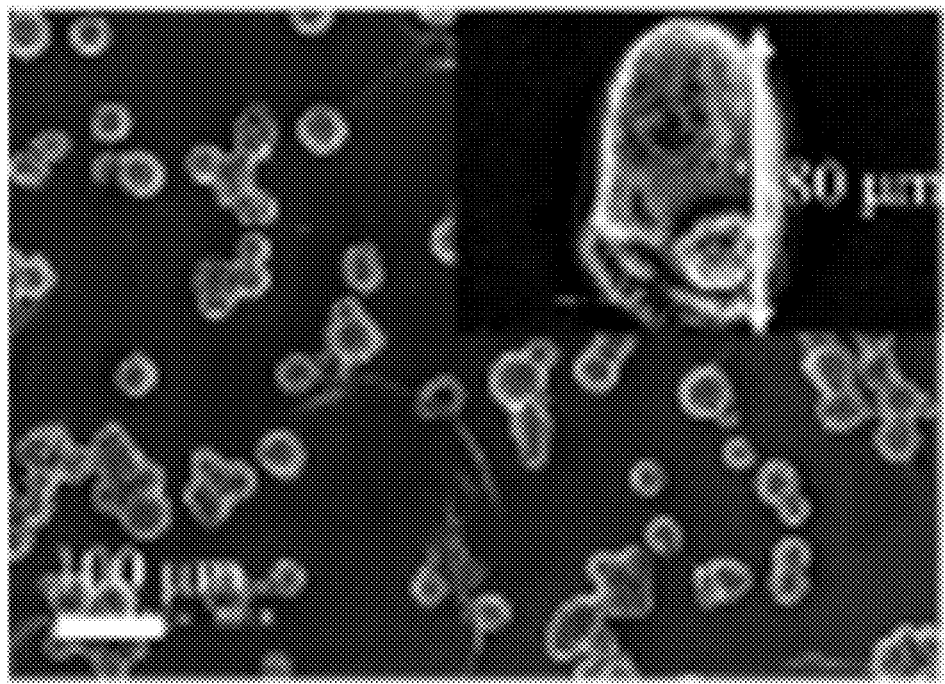
FIG. 4 shows a stainless steel sample with agglomeration.

The technology has the ability to probe for powder-source defects. Powder defects can be due to excessive recycling of powder, oxidation during powder storage, powder contamination (e.g., switching material sets), and the presence of residual oxygen, water vapor, or organic contaminants in the build chamber. All metals have an oxide shell unless they are produced, stored, and used under ultra-high vacuum, which is highly impractical. [22]-[24] These metal oxide shells typically have higher melting points than the interior metal cores and are poorly wetted by liquid metals, so the oxide shell acts as a barrier to metal-metal wetting/fusion. [2], [25], [26] This induces balling and deteriorates the melt pool stability. [27] Oxides have severe impacts on the mechanical properties, particularly fatigue properties, [3], [28], [29] and they also reduce the thermal conductivity of metal powders. [30] Fracture surfaces of metal parts often contain spheres of unfused or partially fused metal spheres, which are attributable to thicker than nominal oxides leading to poor fusion. Powders can also be contaminated if the felt liners of the powder reservoir are not thoroughly cleaned between material changes. Unfused metal powders can be recycled, but each cycling changes the powder properties by unintentional sintering and oxide growth due to an elevated print environment temperature (FIG. 4). Spatter of many metals have micron-thick oxides. [31] The present technology's unique capabilities for probing these defects is thus especially important for supply chain integrity.

Figure 5:
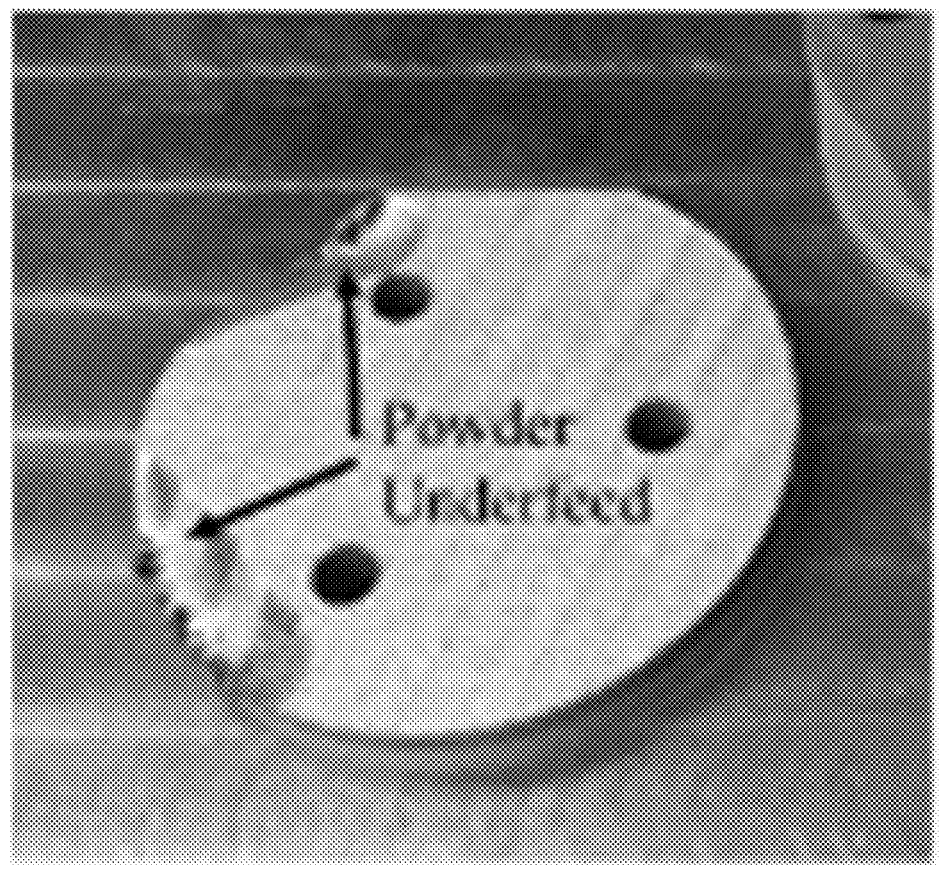
FIG. 5 shows incomplete fusion of powder to part.

The technology also detects defects under circumstances when insufficient powder is deposited. In this case, the laser will raster over consolidated metal rather than powder, leading to unsalvageable parts (FIG. 5). As the recoater blade scrapes along the surface of the metal part, it can break off small pieces of support or parts, especially if the process parameters are nonoptimal or if thermal stress has deformed the part so that the recoater scrapes against the deformed surface. The small metal debris fragments are normally much larger than the average powder and layer height, so they get pushed by the recoater blade. These fragments typically leave a powder denuded track, which becomes a defective area in the part. These types of defects normally result in obviously defective parts that are unsalvageable, because the defect is not immediately corrected and the defect grows with each additional layer. In cases where it takes extensive time to print a part, a powder deposition defect that ruins the part in the last hour will result in a high cost in terms of wasted metal powder and machine time. The present technology can prevent these losses.

Analytical Analysis Method

Cahill demonstrated the development of an analytical model to represent the temperature change at the surface of a multilayer structure expressed by the following Cahill [14]:

$$\Delta T = 2\pi A \int_0^\infty G(k) \exp\left(-\frac{\pi^2 k^2 (w_0^2 + w_1^2)}{2}\right) k\, dk$$

See also, [32], [33] Where $\Delta T$ represents the change in temperature at the surface of the top layer weighted over the area of the probe beam with a Gaussian intensity distribution. The amplitude of the heat absorbed is represented by A, $w_0$ is the $$\frac{1}{e^2}$$

radius of the pump beam and $w_1$ is the $$\frac{1}{e^2}$$

radius of the probe beam. G(k) is represented by:

$$G(k) = \left(\frac{B_1^+ + B_1^-}{B_1^- - B_1^+}\right)\frac{1}{\gamma_1}$$

The B terms are calculated by:

$$\begin{pmatrix}B^+\\B^-\end{pmatrix}_n = \frac{1}{2\gamma_n}\begin{pmatrix}\exp(-u_n L_n) & 0\\ 0 & \exp(u_n L_n)\end{pmatrix} \times \begin{pmatrix}\gamma_n + \gamma_{n+1} & \gamma_n - \gamma_{n+1}\\ \gamma_n - \gamma_{n+1} & \gamma_n + \gamma_{n+1}\end{pmatrix}\begin{pmatrix}B^+\\B^-\end{pmatrix}_{n+1}$$

Where n is the current layer starting with n=1 at the surface. The B values are calculated from the last layer back to the n=1 layer with $B^+=0$ and $B^-=0$ for the last layer because "heat cannot reach the other side of the bottom layer at rates comparable to the modulation frequency." The variables in equation the B terms equation above are represented by:

$$u_n = \sqrt{4\pi^2 k^2 + q_n^2}$$

$$q_n^2 = \frac{i\omega}{D_n}$$

$$\gamma_n = \epsilon_n u_n$$

$\omega$ is the angular modulation frequency and, for each layer, $D_n$ is the thermal diffusivity, $\epsilon_n$ is the thermal conductivity and $L_n$ is the thickness.

The phase lag between the heat source modulation due to the pump beam and the temperature oscillations at the surface can be evaluated as follows:

$$\Delta\varphi = \operatorname{atan}\frac{\operatorname{Im}(\Delta T)}{\operatorname{Re}(\Delta T)}$$

See also [34], [35].

Micro Void Defects Detection.

Figure 6:
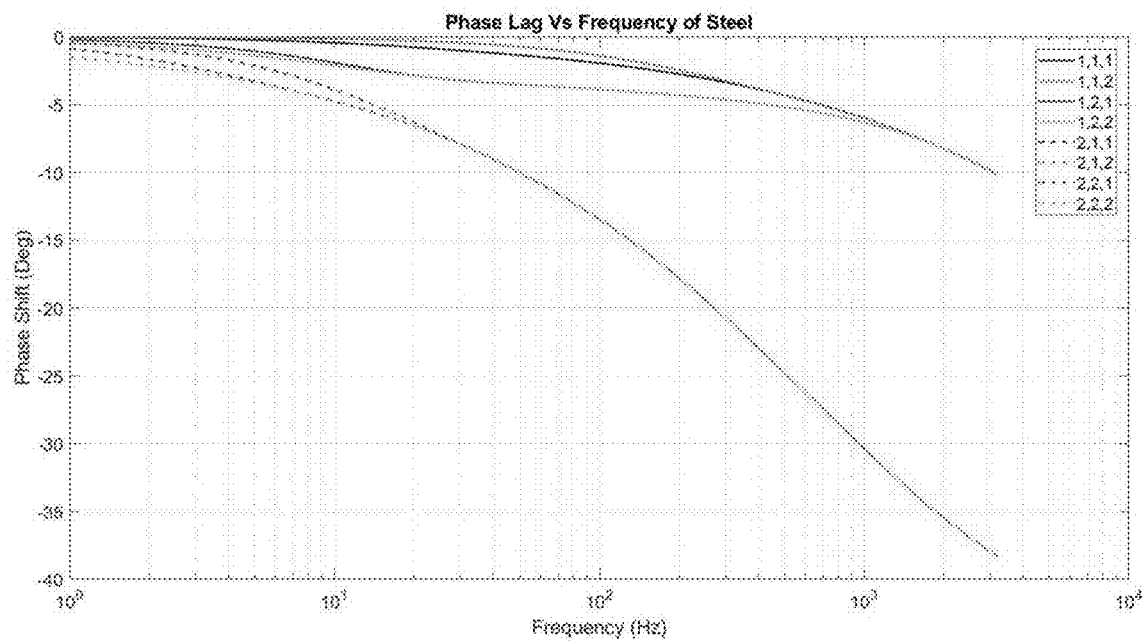
FIG. 6 shows a phase lag dependence on periodic heating frequency for different multilayer configurations of 316L Stainless Steel.
Figure 7:
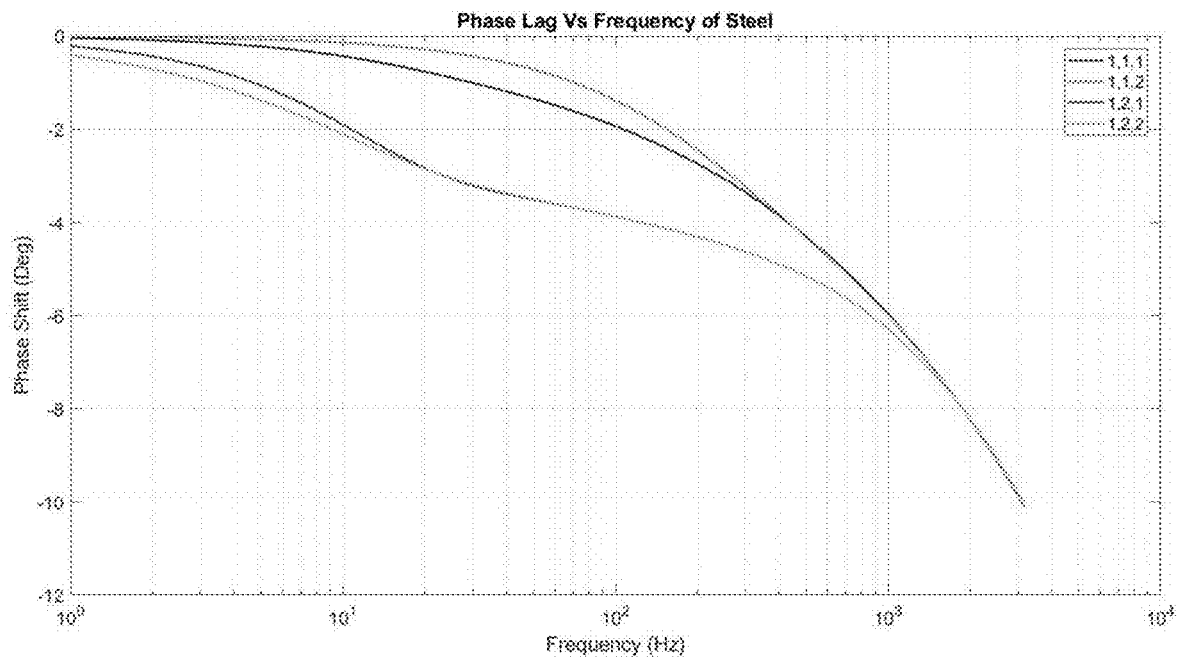
FIG. 7 shows a phase lag dependence on periodic heating frequency for different micro void positions.
Figure 8:
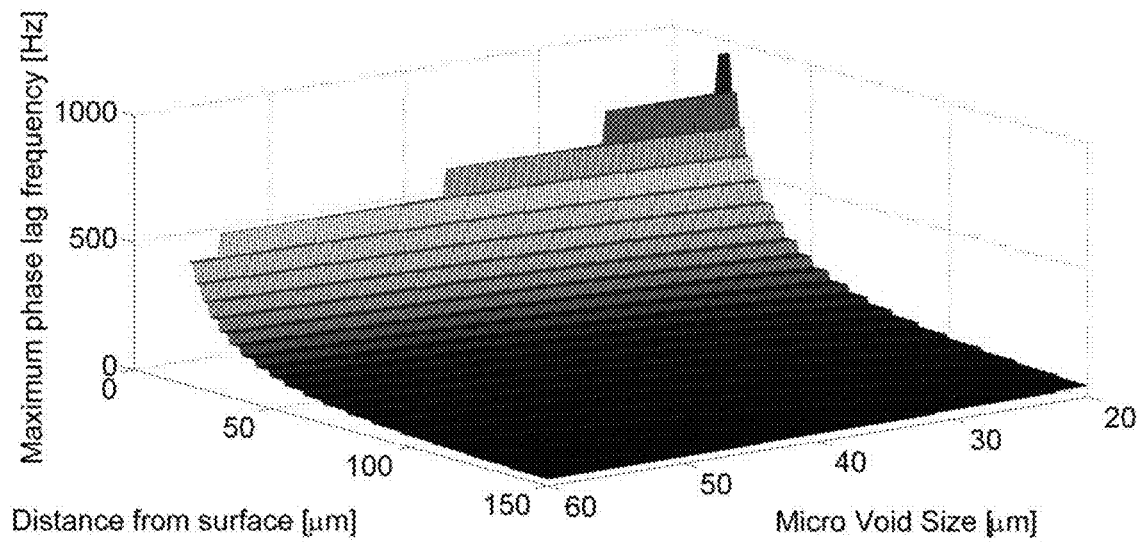
FIG. 8 shows a maximum phase lag frequency dependence on micro void size and micro void distance from the surface in a 121-layer sequence system (1D approximation).

A micro-void defect can be modeled as a layer sequence in which index "1" refers to a metal layer and index "2" refers to an air layer. Hence, we model a micro-void defect by 112, 121 or 122 layer sequences. The phase lag by varying the heat source frequency is presented for different multilayer systems in FIG. 6 and for different micro-void positions is shown in FIG. 7. 112, 121 and 122 layer sequences show a maximum phase lag difference from the 111-layer sequence at ~50 Hz. The phase lag difference between the 111-layer sequence and either the 121 or 122 layer sequences is ~2°. This property may be exploited in micro void detection. However, the phase lag peak difference between the 111 and 112 layer sequences is only ~0.5°. In order to have a qualitative understanding of this phenomenon, we studied a 121-layer sequence case. Results are plotted in FIG. 8.

The smaller the micro void (and/or closer the micro void to the surface), the higher the maximum phase lag frequency. For this reason, the working frequencies range should be tuned on each particular system by studying micro void size and position. This modeling assumes the properties of solid material on top of a defect are the same as on top of a solid material, so the range of frequencies that can be used is not necessarily as narrow as this modeling suggests. As any surface film (e.g., thin oxide or nitride) may change due to the thermal resistance presented by the layer below, which could be picked up at higher frequencies that probe the near surface.

TABLE 1

Materials characteristics

| | ρ [kg m$^{-3}$] | κ [W m$^{-1}$ K$^{-1}$] | c [J kg$^{-1}$ K$^{-1}$] |
|---|---|---|---|
| Metal (316L SS) | 8000 | 16.3 | 500 |
| Powder (316L SS) | 7100 | 0.2 | 500 |
| Air | 0.616 | 0.0454 | 1000 |

See, [36]-[38].

The effective density of the powder was calculated by using the approximate correlation $$k = k_0 * \left(\frac{1-p}{1 + 10*p^2}\right),$$

where k is the thermal conductivity of the bulk material, $k_0$ is the conductivity of the powder and p is the porosity. The effective density of the powder was then calculated by multiplying this porosity by the density of the bulk material.

The implementation of this system can use the primary laser sintering or laser melting as the pump laser, rather than a 488 nm laser. The setup can also use a current flowing through the part to periodically heat the part. The probe laser can be substituted for an IR photodiode or IR camera to sense temperature oscillation's phase. This back reflection can be monitored after the reflection passes through the galvo stage in the SLM printer. See FIG. 9.

Testing samples were created using an EOS M290 metal 3D printer using 316L Stainless Steel powder. These samples had sections where artificial voids were produced by creating a support structure instead of fully sintering the powdered metal in these sections. Four artificial voids were produced in one 316 stainless steel sample and they ranged from 80 μm to 320 μm deep. Then four layers of solid material, with each layer being 40 μm thick, were printed on top of the voids to cover them with 160 μm of solid material. The "voids" are filled with a cross-hatched support structure, rather than pure powder.

The FDTR testing setup was used to test this sample. The samples were first polished with 800 grit silicon carbide polishing paper, to get an acceptable signal with due to the spot size being comparable to the surface roughness, based on use of low power of our experimental lasers. The FDTR lasers are just 0.15 W, while normal selective laser melting lasers are normally between 200-1000 W in commercial systems. The sample was produced with 160 µm of solid material above the voids, so there would be material to polish. After polishing just 40 µm of material was left above the voids. This depth was confirmed via fiducial markers placed in the test artifact. In practical applications polishing would not be necessary, as the diffuse scattering would be more than compensated by the high power of the melting laser, and the larger laser spot size. For instance, EOS M290 uses an 80 µm spot size, about 10 times larger than the test setup. This would reduce the impact of surface roughness.

Figure 10:
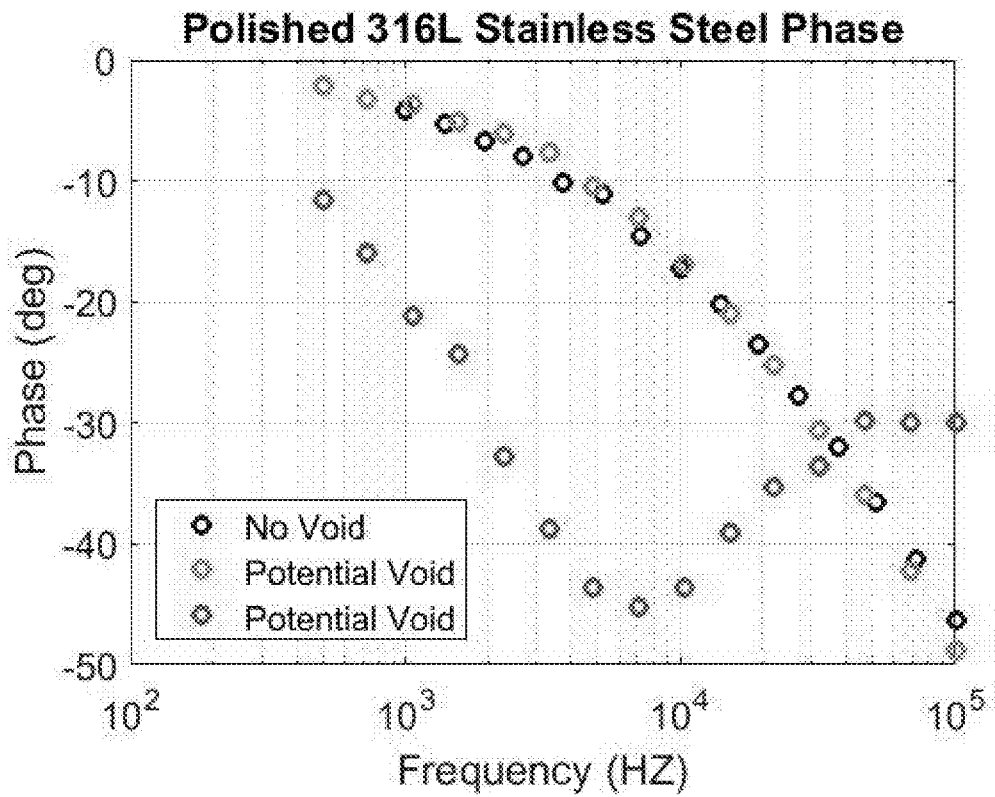
FIG. 10 shows frequency domain thermoreflectance results for 500 Hz to 100,000 Hz oscillation frequency on no void and potential voids.

It can be observed from FIG. 10 that there can be phase lag differences between the area under the fully melted part and the voids. If used in-situ with SLM, the laser would be modulated at around the 10 Hz-5 kHz range, as that frequency results in a large maximum difference between solid and void. The fiber laser used in the EOS M290 can be modulated at frequencies up to 10 kHz, hence today's systems can readily adopt this technology. FIG. 10 also shows that one of the tests at the location of an artificial void nearly perfectly matches the test conducted on a section without a void. We think this is due to support structure produced under the artificial void, hence that point not exhibiting void behavior. The void is filled with support which is designed to be about half as dense as a fully melted section.

Further experiments were conducted with the FDTR setup on another sample, which was produced and polished the same as the previous sample. The experiments were conducted over the frequency range of 50 Hz to 1000 Hz, the range with the largest expected phase difference. The data over this range was collected over the location of one of the voids and the sample was then moved 0.1 mm to a new position over that same void and new data was taken. This process was repeated 20 times to cover the width of the void as well as one other time over a position without an artificial void. The results of the first four positions measured in this experiment are located in FIG. 11.

Figure 11:
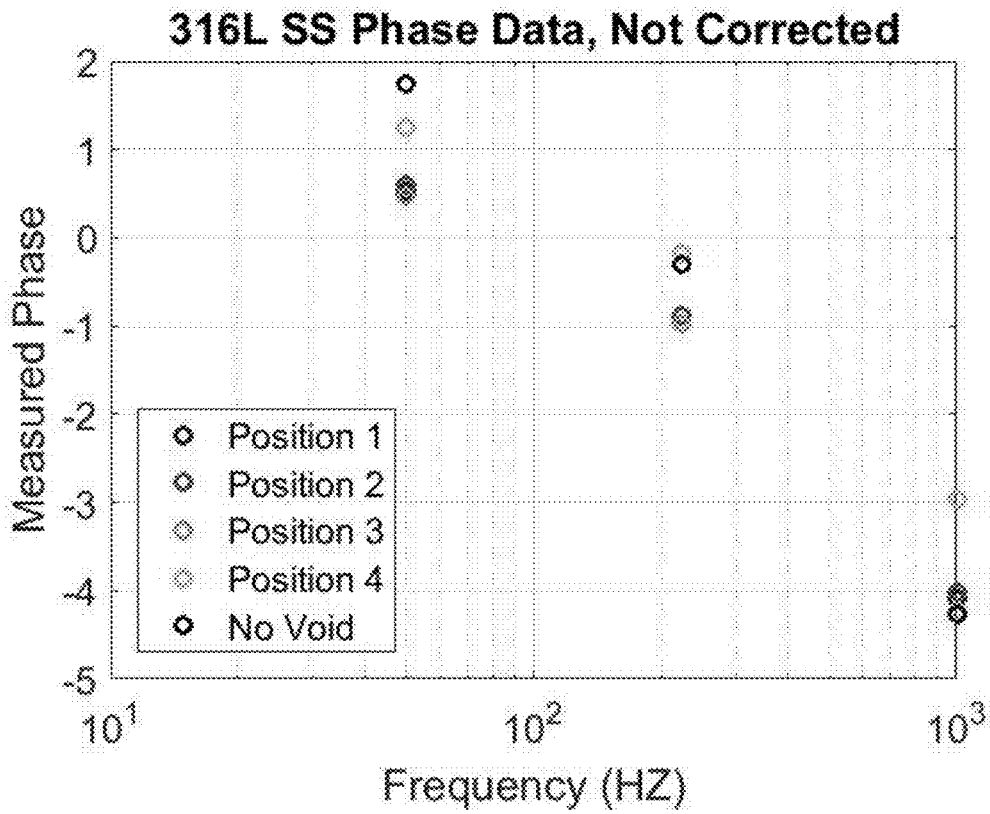
FIG. 11 shows frequency domain thermoreflectance results for 50 Hz to 1,000 Hz oscillation frequency and comparison with no void measurement.

FIG. 11 shows the phase data taken at the first three positions is consistently a different phase lag relative to the no void measurement (undefected baseline data) by approximately 1° at 50 Hz and 0.750 at 220 Hz. These data sets converge at 1000 Hz, because the top layer thermal conductivity is nominal (defect below the surface). However, the data taken at the fourth position diverges at 1000 Hz and is not consistent at the other frequencies. Defects closer to the surface appear at higher frequencies, hence we believe this high-frequency phase difference at position 4 is likely due to a sub-surface defect, like incomplete fusion of powder.

The data taken from this experiment shows a consistent trend of a phase lag differences from the baseline phase shift when sampling over known voids. This supports the results from the theoretical model. The smaller magnitude of the phase shift difference could be due to the voids being located more than 40 µm below the surface of the sample. While simulations of FIGS. 6 and 7 show decreasing phase shift at higher frequencies, experiments in FIG. 10 show differences at higher frequencies. This is an indication of microstructural changes induced by the defect on subsequent layers.

In-Situ Melt Pool Thermal Monitoring

One limitation of conventional thermography is that the signal arises over a large effective depth into the material due to the exposure time of the laser; thus, it represents the thermal history and properties of the substrate in addition to those of the just-printed layer. [39] The distance a thermal wave travels is approximately $\sqrt{\alpha t}$, where $\alpha$ is the thermal diffusivity and t is time. [40] In conventional thermography, the thermal wave penetrates beyond the top-most layer (>100 µm). In the present technology, using modulations of around 50 kHz, the measured depth can be controlled depending on the frequency chosen (~µm and below possible). Especially important for widespread adoption, this measurement technique does not require significantly more hardware than current solutions.

Realtime Meltpool Feedback Control

This technique can also allow modification of process parameters to account for variation in the substrate preheating conditions, thermal conductivity of the underlying substrates, geometrical effects, variability in the powder. The pre-heating condition varies due to how far the print is above the heated build platform and the previous laser writing path. The thermal conductivity changes the optimum laser exposure. For instance, if the underlying layer is lower conductivity (e.g., powder versus solid), then the thermal wave propagates less slowly and less laser heating is required to melt that voxel.

The temperature oscillations measured via the periodic signal phase(s) and/or amplitude(s) can be used to provide feedback for control over the mean laser power. In another control mode, the phase lag at different frequencies can be used to determine the melt pool depth. Higher frequency heating will sense closer to the surface and lower frequency will sense deeper. This phase lag versus several frequencies can be used to indicate the melt pool depth. The nominal versus too shallow or too deep phase vs. frequency response can be determined via empirical or modeling and compared to instantaneous signals. In an empirical approach, the phase response of too little laser power or too fast a scan speed will be compared to too much power or too slow a scan speed to determine the near-optimal frequency domain response of a proper printing sample. The phase lag of the meltpool will be a function of the thickness of the melt pool, and so can tell if the laser is penetrating sufficiently deep to melt about 2.5 layer thicknesses, as typically desired for selective laser melting. Therefore, feedback control can use the phase and amplitude signals as input into the heat source controller to tune laser processing (e.g., power and scanning speed). Non-realtime use, so called feed-forward mode, can use the obtained signal to modify the subsequent layer of processing based on the response of the previous layer in that spot.

Investigating the Most Recent Layer

Figure 12:
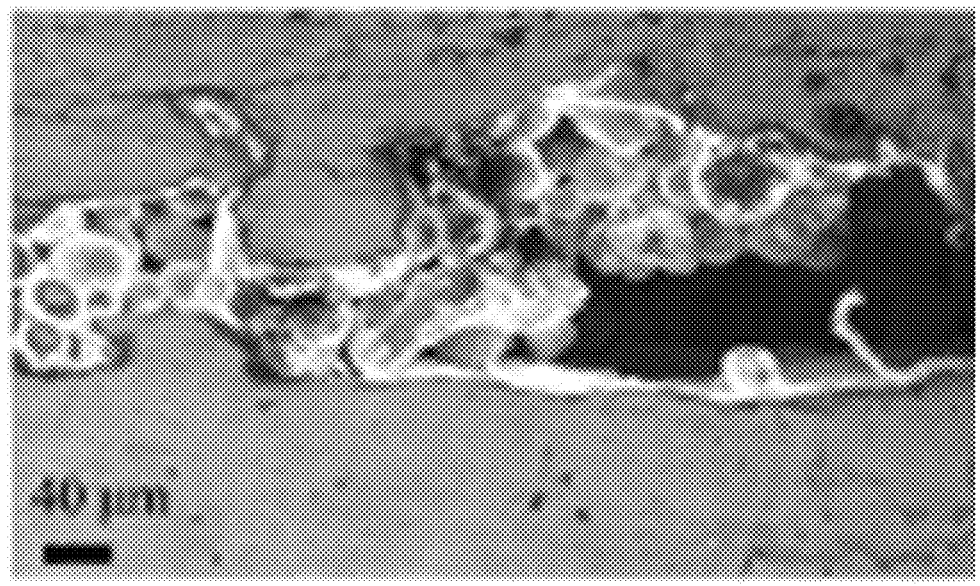
FIG. 12 shows a powder underfeed defect.
Figure 13:
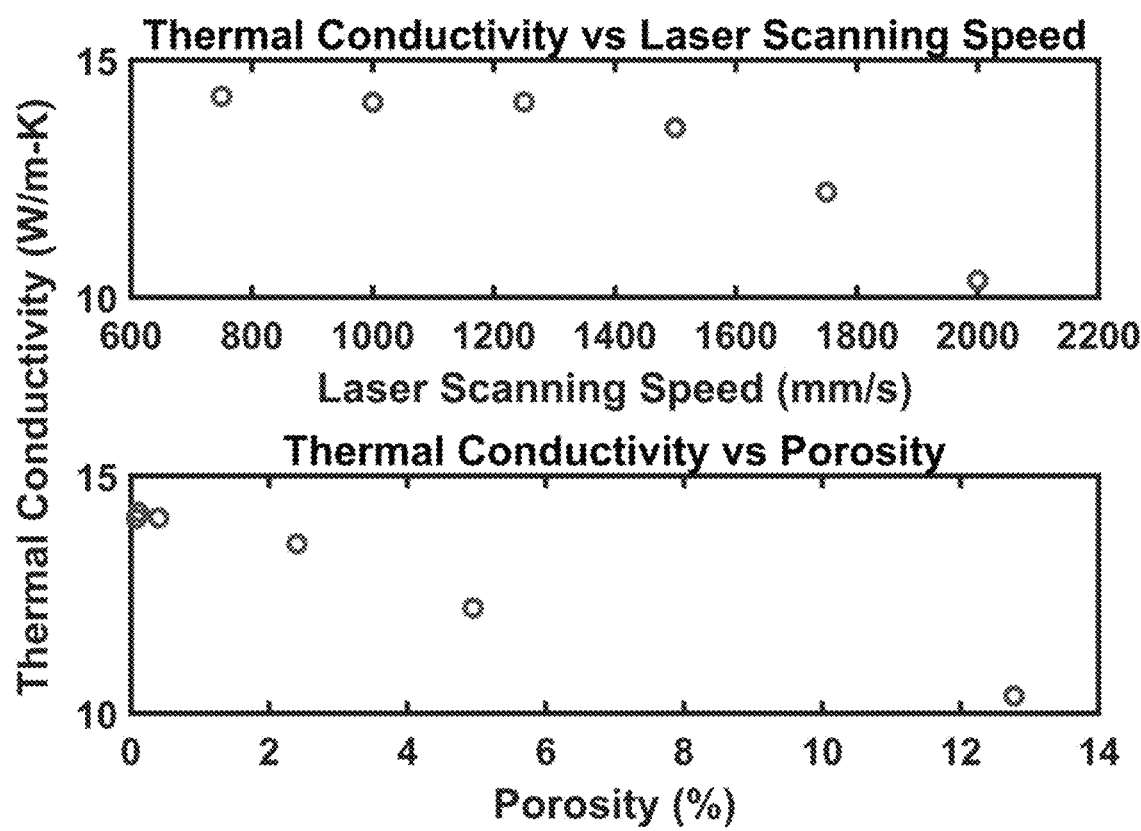
FIG. 13 shows the thermal conductivity of Stainless steel 316L vs. laser scanning speed and porosity.
Figure 14:
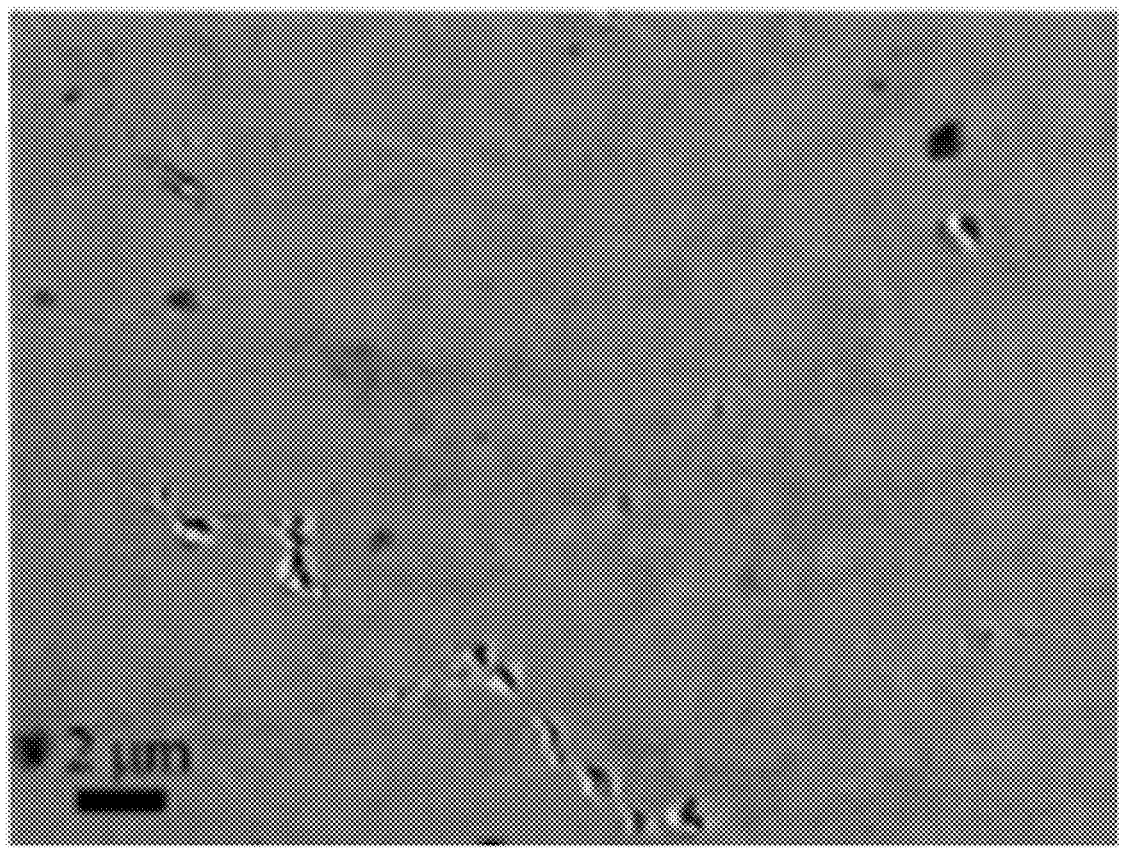
FIG. 14 shows porosity and microcracks.
Figure 15:
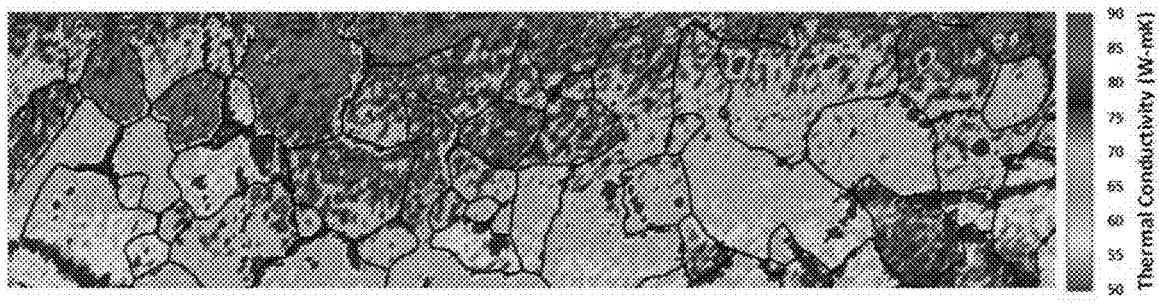
FIG. 15 shows thermal conductivity mapping from periodic heating response, in which defects at grain boundaries are observed as the low conductivity regions between grains.

Defects can also occur during laser melting, when process parameters incompletely melt the powder or fail to fuse the powder to the layer below (FIG. 12). These defects can be detected as a sharp change in thermal conductivity (FIG. 13). [9], [10] Other defects can form when a laser turns off suddenly at the end of a contour, leaving a keyhole void. Entrapped voids can randomly occur during printing when fluid instability in the melt pool leads to entrapment of vapor in the melt. [41], [42] An example of microporosity and voids is shown in FIG. 14. Spatter is also created when vaporization entrains drops of molten metal, which adds to surface roughness. [43] Thermal conductivity can detect subtler defects before the porosity becomes extreme. [9], [10] Frequency domain thermal conductivity mapping of $Cu_3Sn$ reveals variation in thermal conductivity of different grains and the defects between grains (FIG. 15). This was measured with a benchtop version that simulates the response in a printer post-printing a layer. The spot size in this setup was smaller than a typical printing laser spot, so resolution will vary with heating source focus.

The present technology can scan the just printed layer as part of a post-print rewarming or annealing step, so as to not slow the print speed. The DC laser power for this scan will be less than melting or sintering laser power, and can be set to combine with a beneficial annealing step. It can also be sped up from a typical print scan by intentional defocusing the laser beam to use a larger spot size for interrogation. This technique can also evaluate and predict the phase and crystal structure of the 3D printed material based on the thermal properties measured. By testing processing parameter space and mapping micro/nano-structure, a mapping of microstructure/nanostructure from periodic thermal response data can be used to validate and confirm printed properties at the microstructure/nanostructure.

The thermal conductivity of the printed part can give insight into the microstructure. Off-optimal processing will result in lower thermal conductivity. In stainless steel, this non-optimal processing also corresponds to partially amorphous domains in the stainless steel grains. While transmission electron microscopy or X-ray diffraction is necessary to directly observe this, thermal conductivity can indirectly sense this microstructural change. [9], [10]

Repairing the Most Recent Layer

Scanning of the most recent layer according to the present technology permits identification of voids or defects in the layer. If the phase and/or amplitude of the periodic signal exceeds an acceptable value, that area can be remediated. If voids are found, it would then be possible to add more powder, if necessary, and re-melt the layer by scanning over it again with the laser at melting power. The layer could then be scanned again to ensure that it is now is free from defects. This process could be repeated multiple times if necessary to correct defects in the layer before proceeding to the next layer.

By repairing parts during the print process, the number of parts that are rejected due to problems during the printing process should be significantly reduced, and the quality of parts so-produced ensured. This reduces the time and material losses incurred due to failed parts, and decreases the number of covert defects. It also has the potential to allow powder to be recycled more times than is currently recommended by modifying the process parameters depending on the composition of the specific powder being used.

Alternate Embodiments

The present technology may also be useful in electron-beam additive manufacturing, laser welding, electrically-driven welding, jet-based printing processes that fuse powder. In the case of electron-beam additive manufacturing, the electron beam can be modulated instead of the laser. In the cased of welding laser is modulated instead of the selective laser beam. In conventional welding, the welding current could have a slight modulation added, which locally varies the heating intensity. In an alternate embodiment the periodic heating can be achieved by dithering the path of the heat source rather than modulating the intensity. In another embodiment, the directed energy source may be modulated, but rather than sensing periodic blackbody emissions, the changing reflectance could be used to sense temperature.

The technology may also be applied to various other additive manufacturing technologies, even those without raster optical pulse energy characteristics. Thus, where the respective technology provides layer-at-a-time addition, or non-optical pulse technology, a non-destructive pulse laser may be supplied for testing or annealing purposes only. Similarly, the present technology may be retrofit to a manufacturing machine or cell that did not originally include the technology. Further, in some cases, the technology may be provided as a software upgrade, or a software and sensor upgrade or upgrade kit.

In some cases, a routine frequency domain decomposition (Fourier transform) may be less efficient or appropriate than another type transform or analysis. For example, a wavelet transform analysis, Laplace transform, Z-transform, Volterra series analysis, See, [44]-[49].

The periodic thermal response is the amplitude of temperature oscillations and phase of those oscillations relative to the drive frequency or frequency. The driving waveform can be composed of a one or more frequencies.

Microstructure-Thermal Conductivity of 316L Demonstration

The use of additive manufacturing for producing prototypes, as well as final products, is continuing to become more commonplace. Material properties of parts made with these processes aren't necessarily the same as the accepted properties for the base materials used, due to the unique processes used to produce the parts. As our work on the thermal conductivity of samples produced using the selective laser melting additive manufacturing process from 316L stainless steel show, thermal conductivities can vary significantly from accepted thermal conductivity of 316L, indicating microstructural changes that are of non-destructive testing benefit.

Depending on the process parameters used when creating parts with selective laser melting, the physical properties can vary significantly from the bulk properties of the same chemical composition material. [50] For example, Gong observed a change in ultimate tensile strength from 1237 MPa to 978 MPa in Ti-6Al-4V specimens produced by SLM by changing the laser power and scanning speed. [50] That translated to a 21% reduction in ultimate tensile strength. See, [15]. This same change in processing can influence the thermal properties, that can then be picked up with this technology.

Metal additive heat exchanger and heat pipes have great potential to improve efficiency and reduce weight of heat transfer equipment. While stainless steel is not a particularly high thermal conductivity metal, it does possess high temperature and corrosion resistance, which makes it appealing for high-temperature and corrosive environment heat transfer applications. [51]-[54] Additive manufacturing has also attracted attention for manufacturing molds for injection molding. Cooling time in injection molding can be "between 60% to as much as 90% of the total cycle time." [55] In this application, thermal conductivity is also important, as it dictates the rate at which injection molded parts can be produced. Stainless steel is often used for molds for medical applications that value smooth surfaces and with polymers that have corrosive precursors (e.g., PVC). [56] For these applications, and heat transfer applications other materials (e.g., aluminum and copper) in-situ measurement of thermal conductivity has utility.

An additional motivation for studying the thermal conductivity is the relationship between mechanical and thermal properties for better non-destructive testing. The thermal properties of the SLM part can vary due to the unique processing technique that induces rapid cooling (e.g., ~$10^5$ to $10^{7\circ}$ C./s). [57]-[59] This rapid quenching could lead to non-equilibrium states that trap impurities or stress the metal. There may be unfused powder that did not wet the metal below due to an oxide film and/or processing power. Porosity from voids created by pinholing and splattering also lower thermal conductivity. [60] There is also anisotropy induced by the melt and solidification process. [61] The relationship between thermal conductivity and other properties of interest, like mechanical properties, make the measurement of thermal conductivity of great non-destructive testing value.

However, the thermal properties of parts made using selective laser melting method have not been thoroughly investigated. The variation of porosity and thermal conductivity of 316L stainless steel samples produced using selective laser melting with a varying laser scanning speed is investigated in bulk and at the microscale. Thermal conductivity was measured both through the selective laser melting build layers and along the build layers. A critical laser scanning speed was observed, while holding all other process parameters constant, above which the porosity started to rapidly increase. A linear relationship was also observed between thermal conductivity and porosity, up to a porosity of 12.8%. The thermal conductivity along the layers was also found to be higher than the conductivity through the layers when the laser scanning speed was increased above the critical laser scanning speed due to defects present perpendicular to the build plane. Local thermal conductivity maps were produced using frequency-domain thermoreflectance. For the lowest-porosity sample, the map shows variation in the local stainless steel thermal conductivity values between 10.4 and 19.8 W/m-K. The average thermal conductivity, of the thermal conductivity map, agrees within measurement uncertainty with flash diffusivity measurements of the bulk thermal conductivity. This indicates thermal conductivity is useful in identifying porosity, and microstructure in additive manufacturing, including over small length scales. The following discussion provides greater detail on this relationship for 316L.

Previous work has shown that SLM of 316L produces fine dendritic grains, on the scale of 1 µm, that grow parallel to each other in separate colonies. [62]-[65] The crystallization type has also been shown to depend on the location within the melt pool. [62] Higher energy density can cause recrystallization in previous layer, where a lower energy density may not, and can also cause an increase in dendrite size. [62]

The dominant phase present in 316L produced from SLM is austenite, because 316L does not develop martensite when quickly cooled to room temperature. [62]-[64], [66] When cooled slowly, or not held at high temperature long enough, sigma and delta-ferrite phases, along with carbide precipitates, can develop. [66] It has been shown in previous work that as-printed SLM parts produced with 316L can contain both sigma and delta-ferrite phases in an austenite phase matrix. [65], [66] The sigma and delta-ferrite phases can be reduced or eliminated by holding the temperature of the material at temperatures above 1000° C. for a certain amount of time and then quenching in water. [66]

Different phases and precipitates found within a material can influence the thermal conductivity of the material. While studies have not been done for 316L, aluminum alloys have been studied and have shown a change in thermal conductivity with microstructure due to different heat treatments. [67], [68] However, Si solutes were found to be a major factor in the changing thermal conductivity. [67] Similar heat treatment is not typical for 316L. While there is a lack of thermal conductivity studies for additively manufactured materials, including stainless steel 316L, there are several relevant thermal transport studies of bulk stainless steels, sintered stainless steels, and powdered stainless steels in literature. [36]-[38], [69]-[72] These studies found the thermal conductivity of 316L powder to be ~0.1-0.2 W/m-K and that thermal conductivity decreased with increasing porosity in sintered stainless steels.

Material and Methods

An EOS M290 selective laser melting printer produced 316L 8×8×1.5 mm stainless steel samples under varying laser scanning speed while holding power fixed. After these samples were made, they were removed from the build platform using a wire EDM machine and the two 8×8 mm faces were polished so the different characterizations could be performed. The samples were characterized by local thermal conductivity mapping, bulk thermal conductivity measurements, electron backscatter diffraction, x-ray diffraction, energy dispersive X-ray spectroscopy, and optical microscopy as a function of processing parameters.

Powder bed selective laser melting was used to produce samples. This is achieved by taking a 3D model of the part to be made and splitting it into layers the thickness of the metal powder layers to be deposited. Then, after each layer of powder is deposited, the melting laser scans over the section of the layer that makes up the 3D model in that layer, fusing it into solid metal.

Many parameters can be adjusted that tell the machine how to produce the part. One of the most obvious parameters, as already mentioned, is layer height. This tells the machine how far to drop the build platform in the z-direction so the correct thickness of powder is deposited to form the next layer. Laser power and laser scanning speed can also be adjusted to produce adequate melting of the powder layer. Another major parameter that can be changed is the spacing between adjacent scan lines. This is known as hatch spacing. These properties can be linked together into a single variable for conducting tests, energy density. The energy density is defined by $$\text{Energy Density}\left[\frac{J}{mm^3}\right] = \frac{\text{Laser Power [W]}}{\text{Laser Scanning Speed}\left[\frac{mm}{s}\right] * \text{Hatch Spacing [mm]} * \text{Layer Thickness [mm]}}$$

Two sets of six testing specimens were produced using an EOS M290 SLM printer using EOS's 316L stainless steel powder. [73] Each of the samples produced was 8×8×1.5 mm and they were built using a layer height of 40 µm and a hatch spacing of 90 µm. The laser power was set to 200 W and the laser scanning speed was varied from 750 mm/s to 2000 mm/s in increments of 250 mm/s, representing energy densities from 74.1 J/mm³ to 27.8 J/mm³ respectively. These samples were produced in two sets, one set with the 8×8 mm faces parallel to the build platform in the x-y plane and the other with them oriented vertically in the x-z plane. This allowed testing of thermal conductivity both through the build layers, referred to as through plane and measured using the x-y orientation samples, and along the build layers, referred to as in plane and measured using the x-z orientation samples.

Figure 16:
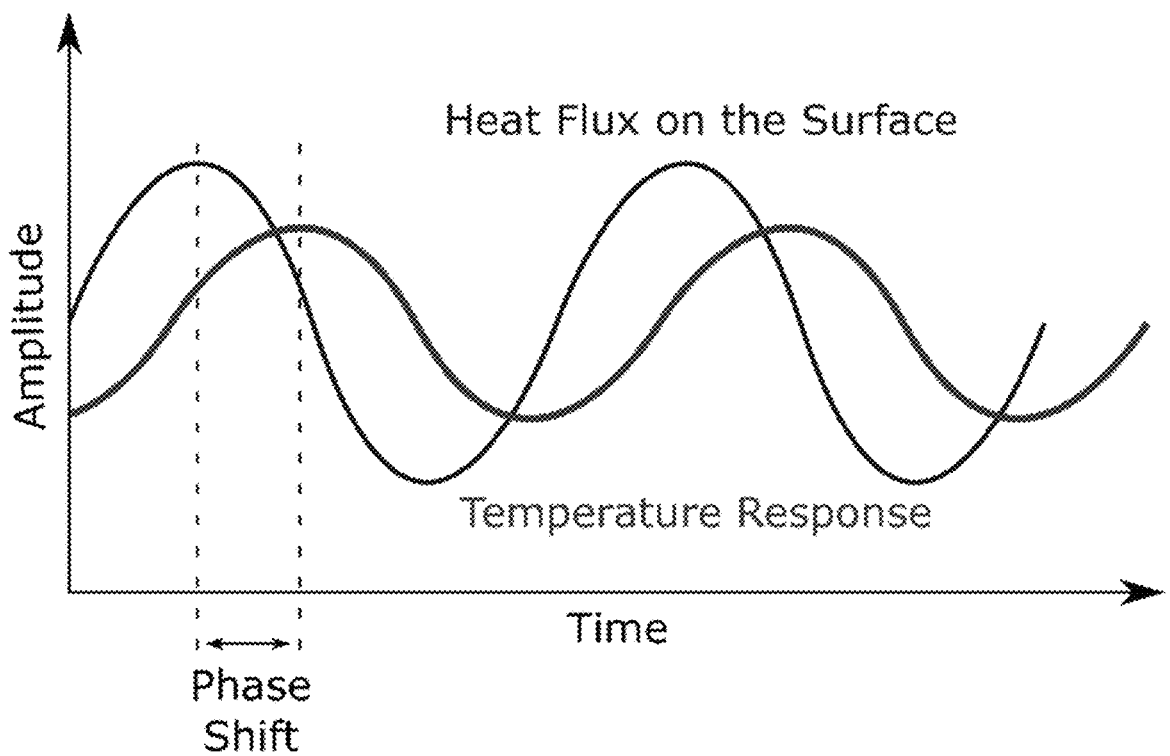
FIG. 16 shows a representative surface response of amplitude over time, showing a characteristic phase shift.

After the samples were made, they were removed from the build platform by using wire EDM. They were then polished using progressively finer silicon carbide polishing paper from 240-800 grit before conducting flash diffusivity tests. When flash diffusivity testing was done, the samples were further polished with progressively finer polishing compound from 6-0.05 µm before taking optical images and testing with FDTR. FIG. 16 shows a representative FTDR surface response of amplitude over time, showing a characteristic phase shift.

Images of the polished surfaces of each sample were taken using a Zeiss Axio optical microscope. The images were then imported into the ImageJ software. [74] In this software, the images were converted to 8-bit binary. The analyze particles function in ImageJ was then run to give the percentage of the area in the image made up of voids. This allowed the porosity of each sample to be measured optically from these images.

Density was calculated by multiplying the percentage of solid metal in the images by the density of the solid material given in the EOS datasheet. The results were verified by measuring the mass of the samples, with a scale, and the volume of each sample, using a Quantachrome UltrapyC 1200e ultrapycnometer, to determine density.

Figure 17:
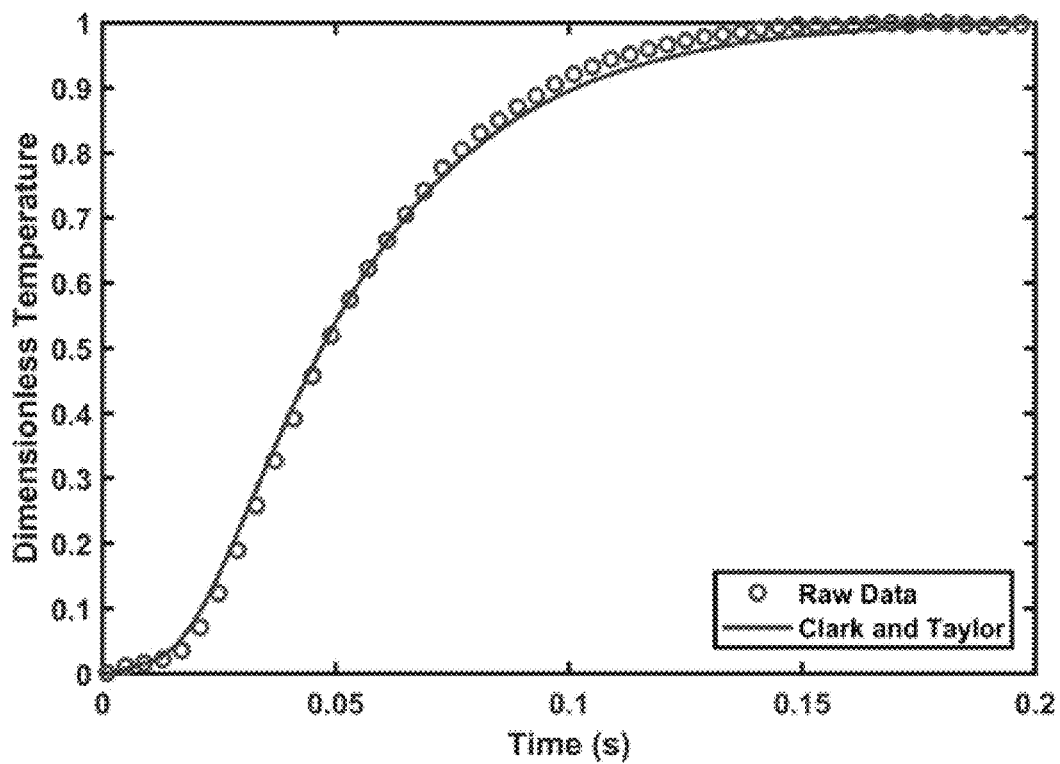
FIG. 17 shows an example of a flash diffusivity fitting plot, k=14.2 W/m-K.

Flash diffusivity tests, which are based on the time it takes a heat pulse to travel through a material, were conducted to determine the bulk thermal conductivity of each sample based on the accepted value for the heat capacity of 316L. [75]-[77] The thermal diffusivity of the samples were determined by fitting, with a nonlinear regression in MATLAB, to the experimental data from the flash diffusivity test. Fitting was performed using equations that were developed to account for radiation heat loss in a flash diffusivity experiment, known as the Clark and Taylor method. [78] An example comparison between the experimental data and the corresponding fit for the through plane, 750 mm/s scanning speed sample, is shown in FIG. 17.

Figure 9:
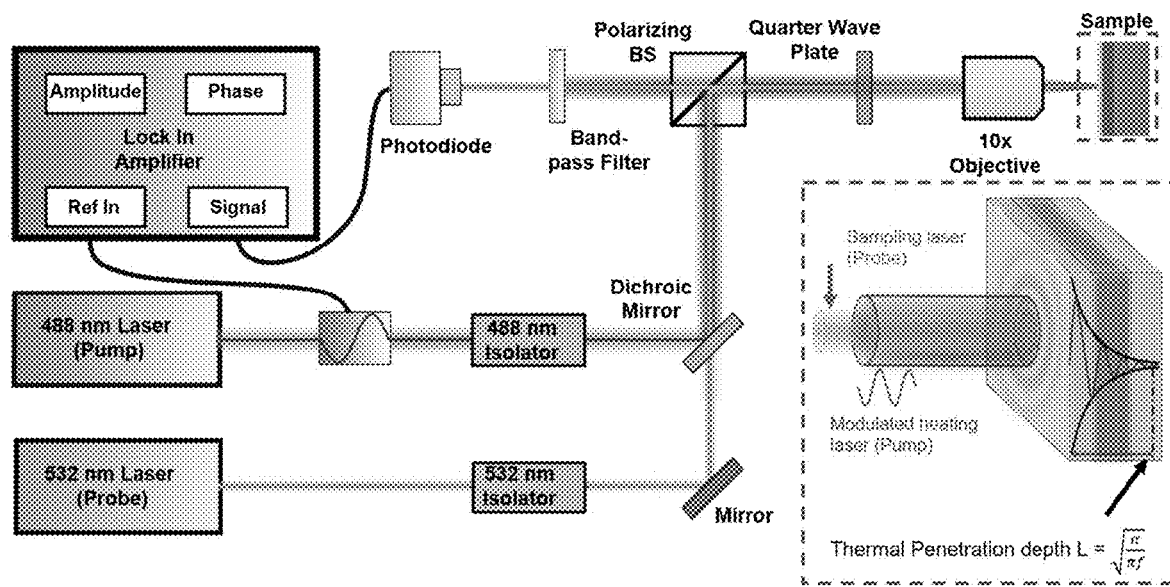
FIG. 9 shows an FDTR experimental setup.
Figure 19:
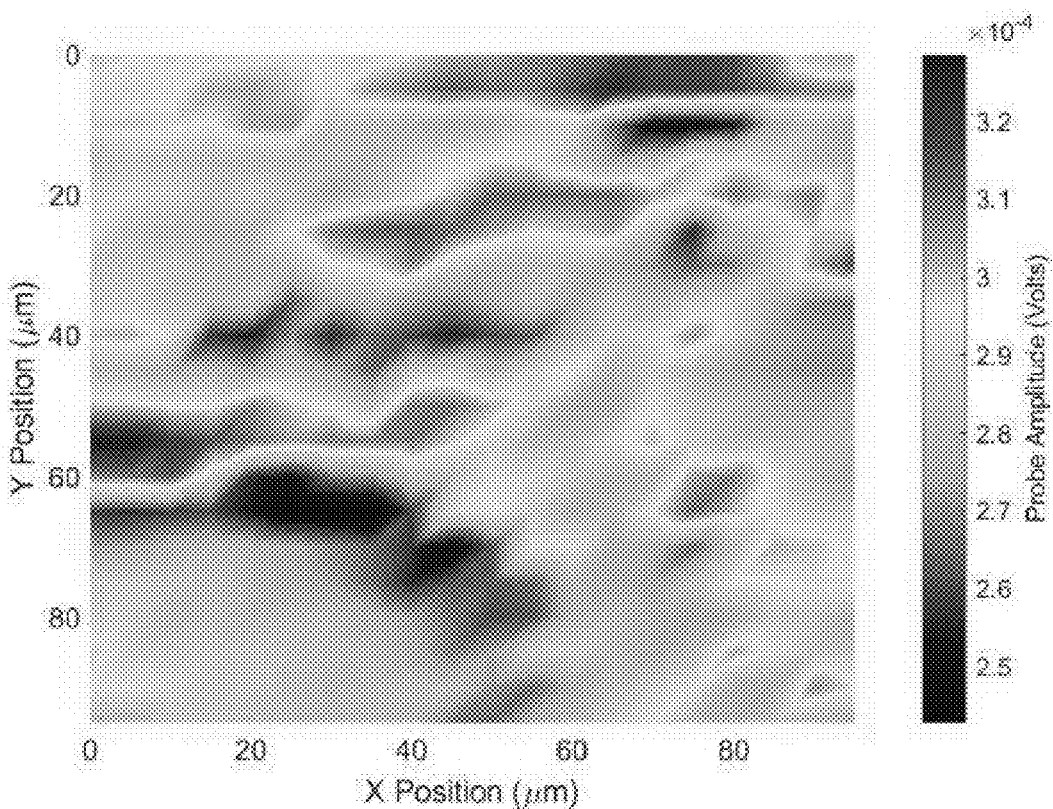
FIG. 19 shows an FDTR amplitude map.
Figure 20:
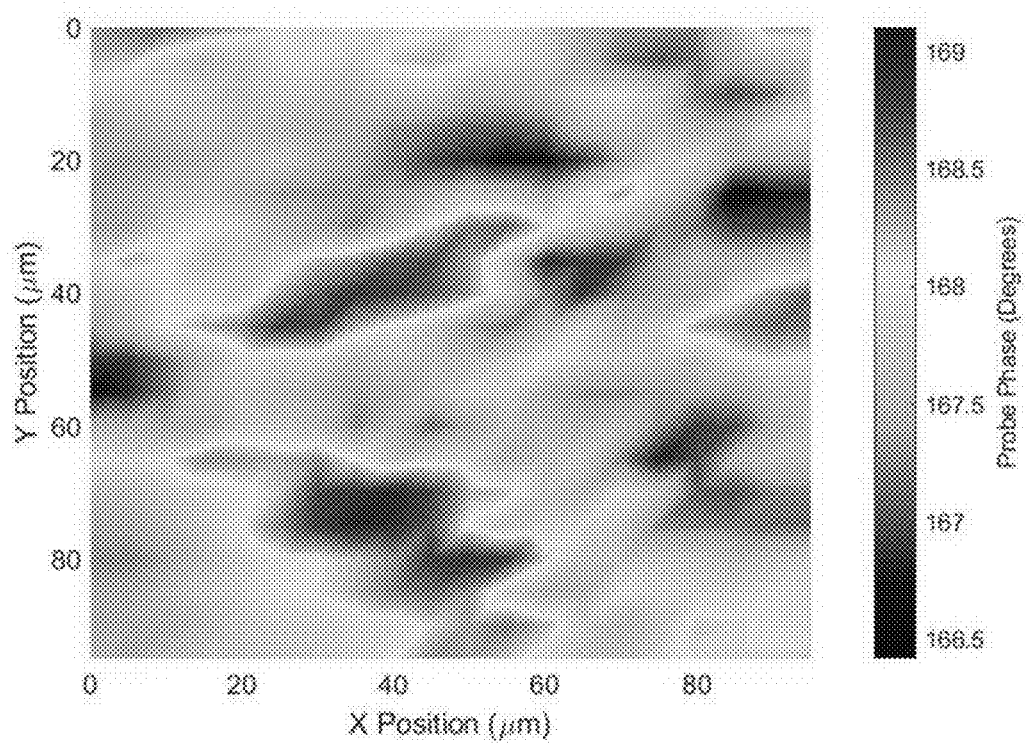
FIG. 20 shows an FDTR phase map.
Figure 21:
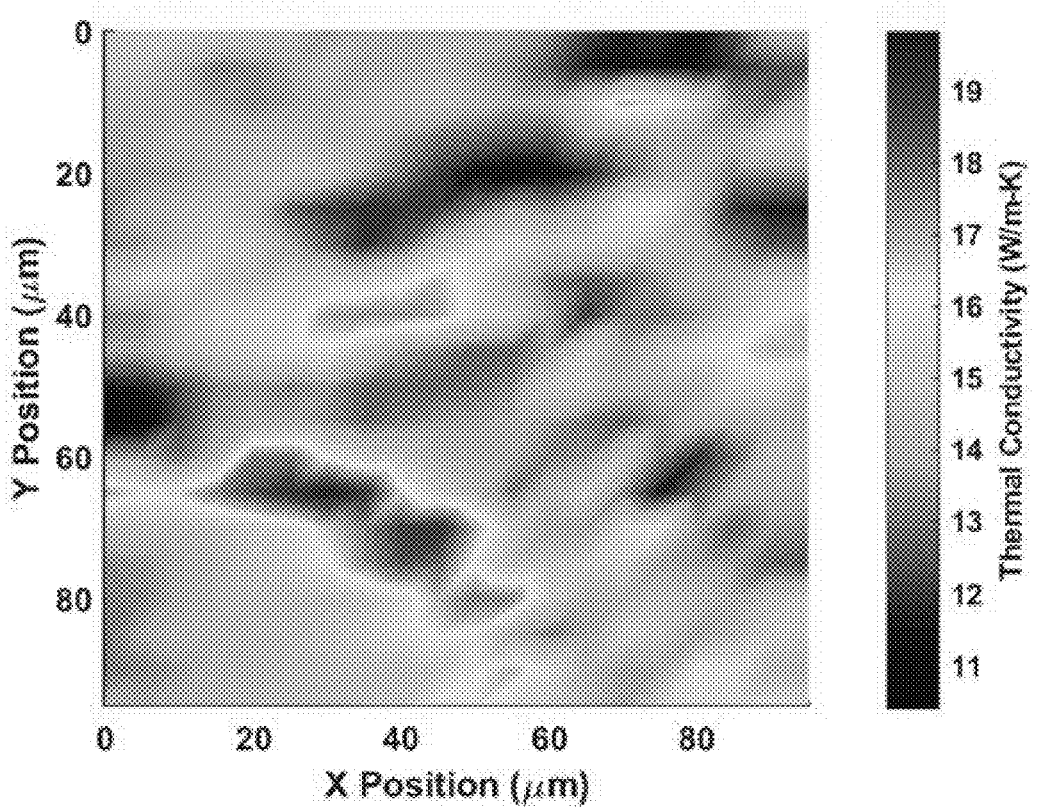
FIG. 21 shows the thermal conductivity map for a 750 mm/s laser scanning speed sample.

The local thermal conductivities of the samples were measured by frequency domain thermoreflectance (FDTR), as shown in FIG. 9. See also FIGS. 18-20, which show an FDTR amplitude map (FIG. 19), an FDTR phase map (FIG. 20), and an FDTR conductivity map (FIG. 21).

This process works by modulating the surface temperature by focusing a modulated laser (488 nm), referred to as the pump, onto the sample surface. [35] As the surface temperature oscillates, it causes an oscillation in the reflectance of the material at the surface. A second co-axial laser (532 nm), referred to as the probe, is then used to sample the temperature through the change in reflectance with temperature. This periodic oscillation of the reflected probe signal is sensed with a photodiode connected to a lock-in amplifier. [35]

Figure 22:
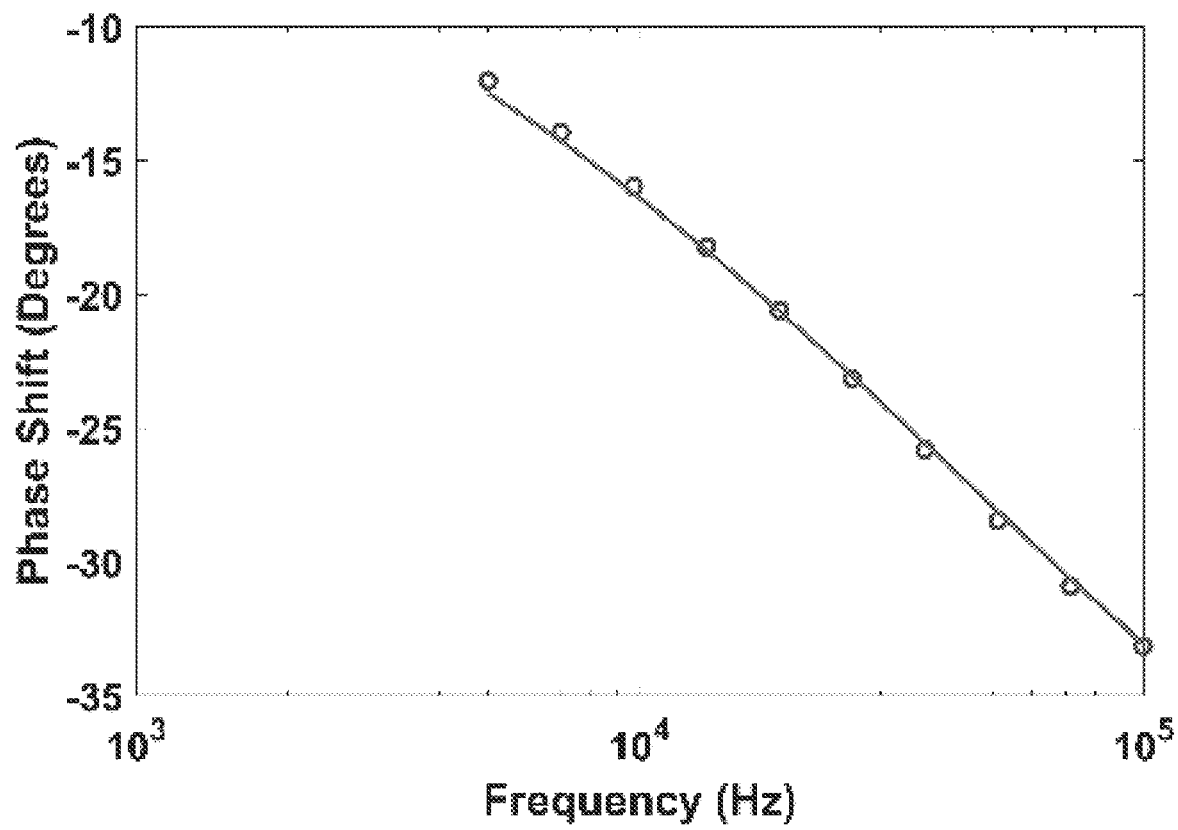
FIG. 22 shows a 750 mm/s through plane sample example fitting plot, k=14.7 W/m-K.

Based on the phase lag between the pump laser and the reflected probe laser, the thermal properties of the material can be determined. [14], [35] Thermal conductivity of the samples was determined by fitting to the phase lag data using MATLAB. An example of the phase lag data from one of the tests is shown in FIG. 22 along with the analytical fit.

The spatial resolution of this technique is approximately 10 m in the x-y direction, with the laser incident on the surface traveling in the z direction. The z-axis sensitivity can be approximated by the following equation for thermal penetration depth. [35]

$$L = \sqrt{\frac{\alpha}{\pi f}}$$

In this equation, L is the thermal penetration depth, a is the thermal diffusivity and f is the modulation frequency in Hz. [35] The testing for these samples was run over a modulation frequency of 5 kHz to 100 kHz, which translates into a thermal penetration depth of 15 µm to 3.4 µm respectively when using 316L as the material. This means that FDTR testing of the samples discussed in this section should be heavily weighted to the thermal properties of one layer in the through plane measurements, because the print layers were 40 µm thick.

Results and Discussion

Figure 23:
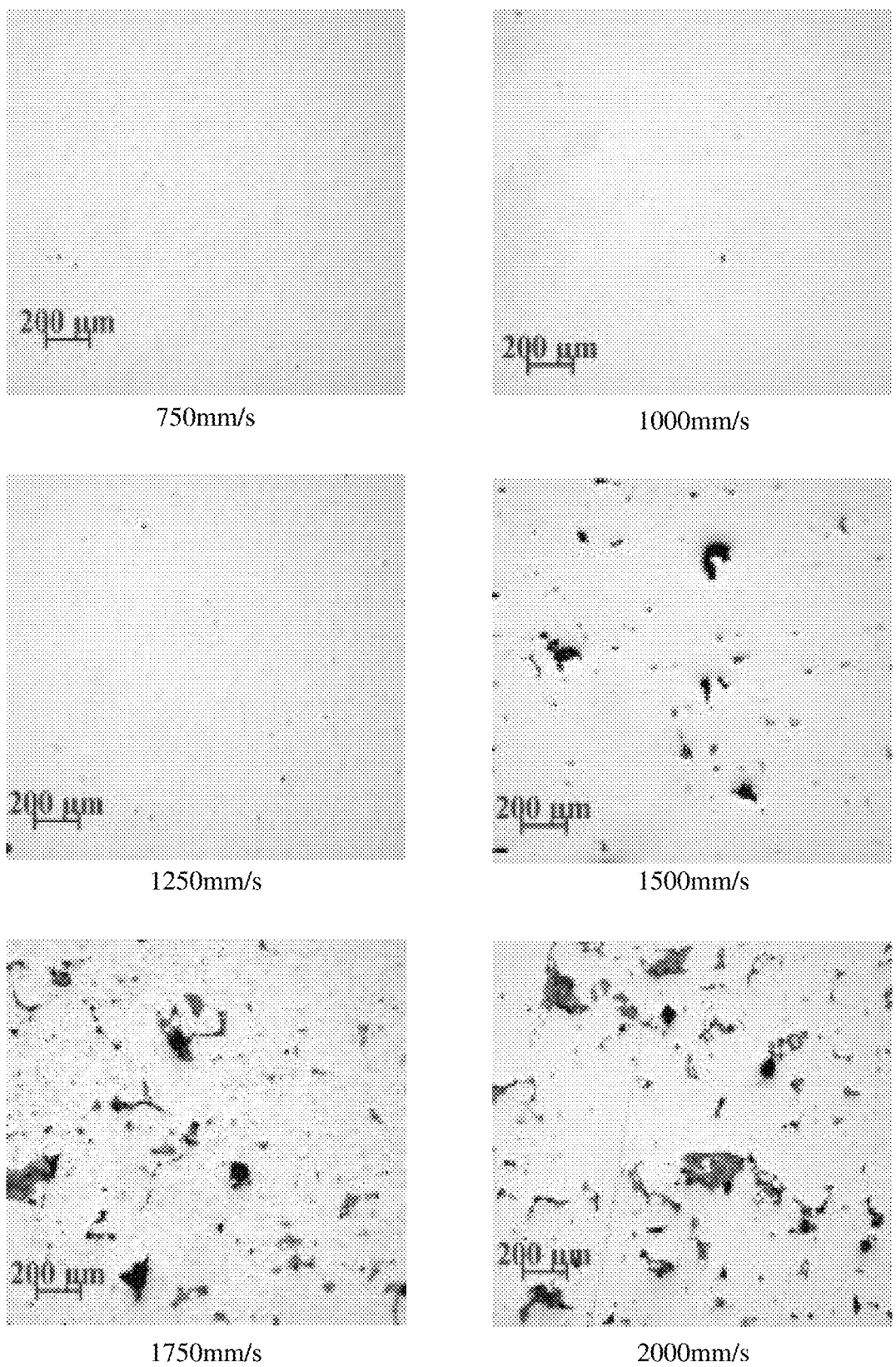
FIG. 23 shows polished surface images, for different SLM scanning speeds.

FIG. 23 shows images taken of the polished surfaces of the six x-y orientation samples, which were used to measure the through plane conductivity. The 750 mm/s and 1000 mm/s samples had minimal voids and the voids they did have were <25 µm. The 1250 mm/s sample had more voids, but the majority were still less than 25 µm in diameter. However, the 1500 mm/s sample showed a significant increase in the number and size of voids, with some voids being >100 µm in diameter. Further increasing the laser scanning speed increased the quantity of large voids, with some obtaining a diameter of over 200 µm.

Figure 24:
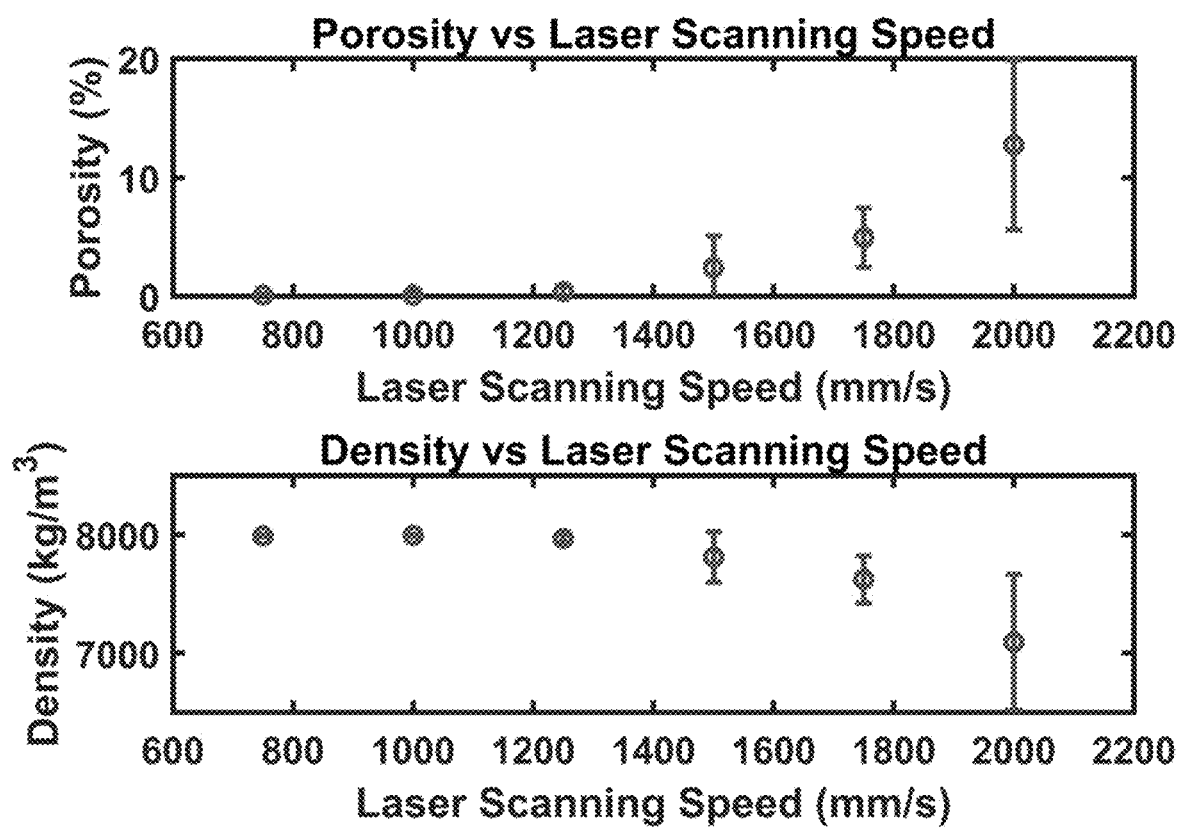
FIG. 24 shows the porosity and density vs laser scanning speed.
Figure 25:
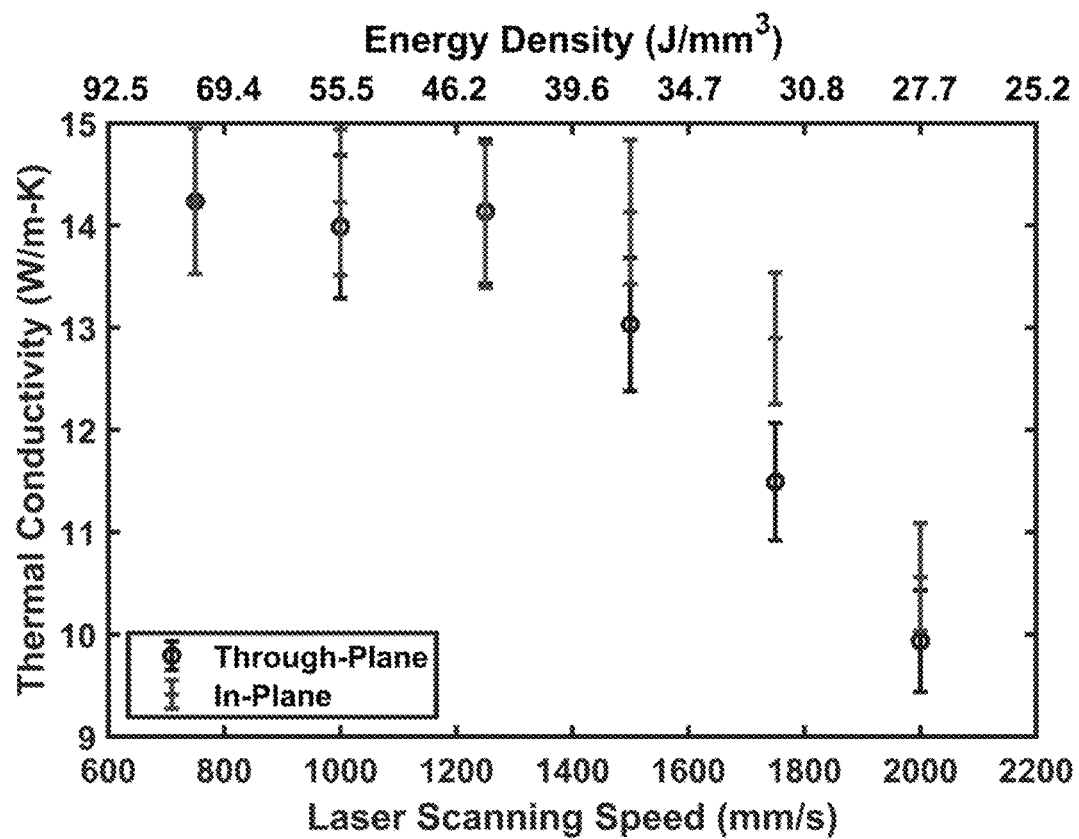
FIG. 25 shows the bulk thermal conductivity vs laser scanning speed comparison

FIG. 24 shows the variation of porosity and density with laser scanning speed in these samples, with the error bars representing two standard deviations from the average measured value. At 750 mm/s to 1250 mm/s scanning speed, the density remained relatively constant at about 7990±80 kg/m$^3$. The highest porosity for these samples, measured optically, was 0.402%. As the laser scanning speed was increased past 1250 mm/s, up to 2000 mm/s, the porosity increased, up to 12.8% at 2000 mm/s, and, in turn, caused the density to drop. The thermal conductivity of each sample was measured using flash diffusivity and the results can be seen in FIG. 25.

The thermal conductivity results from the flash diffusivity experiments indicate that as the porosity increased, the thermal conductivity decreased, as expected. Heat conducting through the material would have to conduct through particles of the material in the void or convect through the gas making up the rest of the space in the void, which would significantly lower the effective thermal conductivity. The extreme case of this is shown in the results found for thermal conductivity of 316L stainless steel powder. This shows a reduction in the thermal conductivity for the powder to be two orders of magnitude when compared to solid 316L. [36], [71]

Prior studies of traditionally sintered 304L and 316L stainless steel powders have similar trends with porosity. [70], [72] They found a relationship between porosity and thermal conductivity of 304L was well described by the effective medium model:

$$k = k_0 \left( \frac{1-p}{1+10p^2} \right)$$

In the above equation, k is the thermal conductivity of the sintered powder, $k_0$ is the thermal conductivity of the bulk material and p is the porosity of the sintered powder. [72]

The Maxwell-Garnett equation, shown below, can also be used to predict the thermal conductivity when porosity is present. [79]

$$k_{eff} = \frac{k_m + 2k_m p \frac{k_i - k_m}{k_i + 2k_m}}{1 - p \frac{k_i - k_m}{k_i + 2k_m}}$$

The Maxwell-Garnet model predicts the effective thermal conductivity of a material assuming it contains spherical inclusions. It does this by using the bulk conductivity of the matrix material, the volume fraction of inclusions, the porosity in this case, and the conductivity of the inclusions, assumed to be zero for this case. Lima et al. also measured the properties of samples produced using traditional metal sintering of 316L. However, instead of a gradual reduction in thermal conductivity as porosity increased, like the results found herein, they showed a large drop in thermal conductivity at about 8% porosity. [70] The bulk thermal conductivity results and the predicted values from the above two equations are shown in FIG. 9. It should be noted that a $k_0$ value of 14.6 W/m-K was used in these two models, as this is the primary thermal conductivity of 316L at 20° C. used by other studies, though values from 14 W/m-K to 15 W/m-K have been used depending on the study. [80]-[83]

Figure 26:
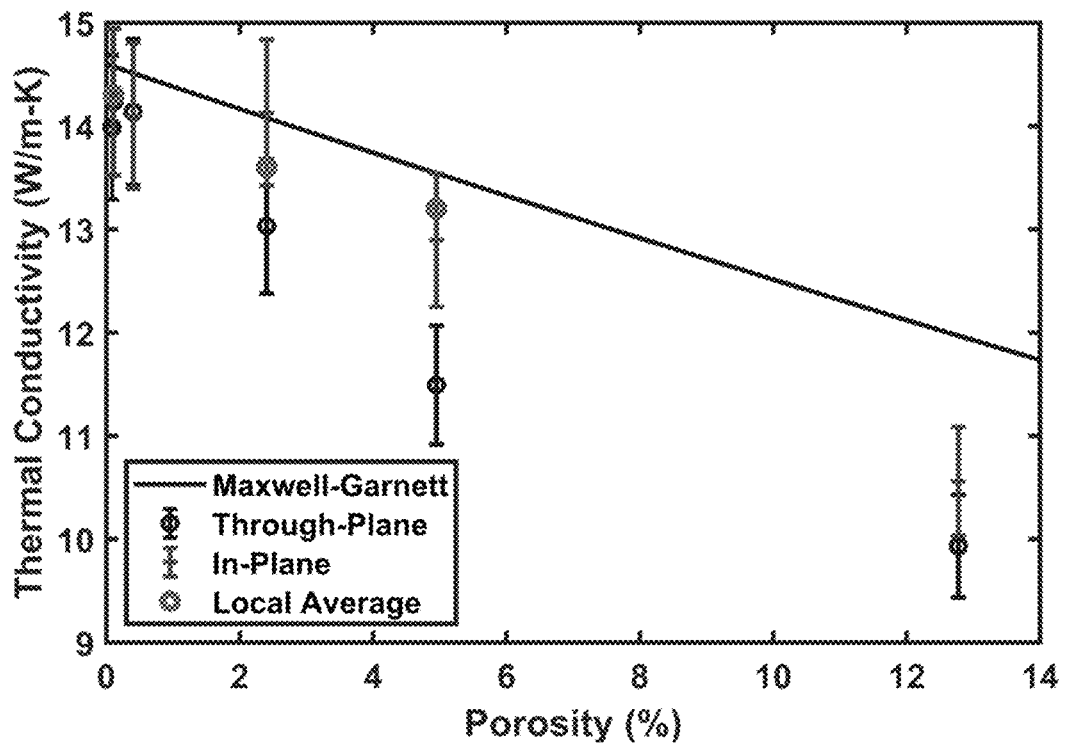
FIG. 26 shows the experimental and predicted thermal conductivity vs porosity.

Despite the shifted conductivity values, FIG. 26 shows that the Maxwell-Garnett equation predicts the same general trend, as was obtained for the samples tested, of a linear reduction in thermal conductivity vs porosity in the porosity range up to 13%. However, the experimental results showed a larger decrease in thermal conductivity for the same increase in porosity when compared to the results from the above two models especially for the through plane measurements.

Figure 18:
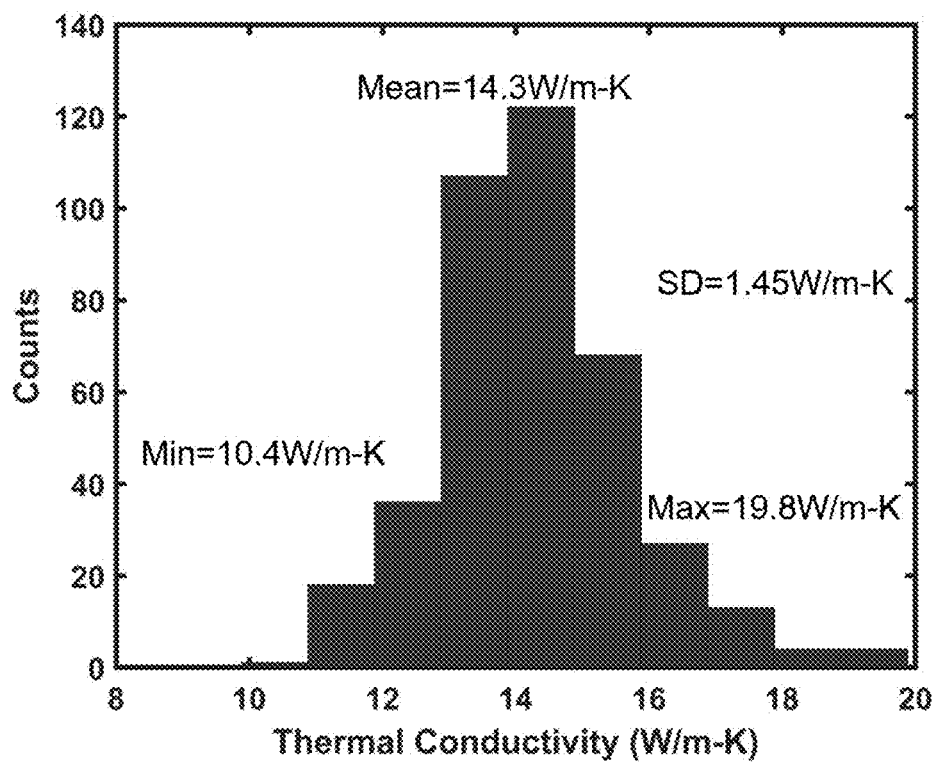
FIG. 18 shows a histogram of FDTR conductivity results.

An FDTR test was also done to produce a map of thermal conductivity values on the surface of the 750 mm/s scanning speed, x-y orientation sample with low porosity. A 20×20 grid of sample positions were tested with FDTR, using a spacing of 5 μm between each position. The resulting thermal conductivity map is shown in FIG. 21, which shows that the FDTR results gave a range of thermal conductivity values depending on the tested position. A histogram of the thermal conductivity values at every point was created and is shown in FIG. 18.

The lowest value for conductivity found in the FDTR test was 10.4 W/m-K and the highest was 19.8 W/m-K, with a mean of 14.3 W/m-K. Many of the points had calculated thermal conductivity values in the range of 13.5 W/m-K to 15.5 W/m-K, which is in the expected range for the thermal conductivity of 316L previously discussed. The higher average conductivity could be an indicator of a thermal resistance between layers of the part, as this measurement is only sensitive to the properties near the surface, with a thermal penetration depth between 15 μm and 3.4 μm as previously shown. The large variation in conductivity values over the tested area could also be due to differences in crystal grain shape and orientation, oxides, or carbides that cause local variations.

To investigate the microstructure of selective laser melted 316L, characterizations were done using both EBSD and EDS. These tests were done on the x-z orientation, 1000 mm/s scanning speed sample. This sample was chosen because the process parameters used were very close to the recommended process parameters from EOS for 316L and the x-z orientation allows the microstructure through multiple build layers to be investigated. The following image shows the EBSD results for this sample.

Figure 27:
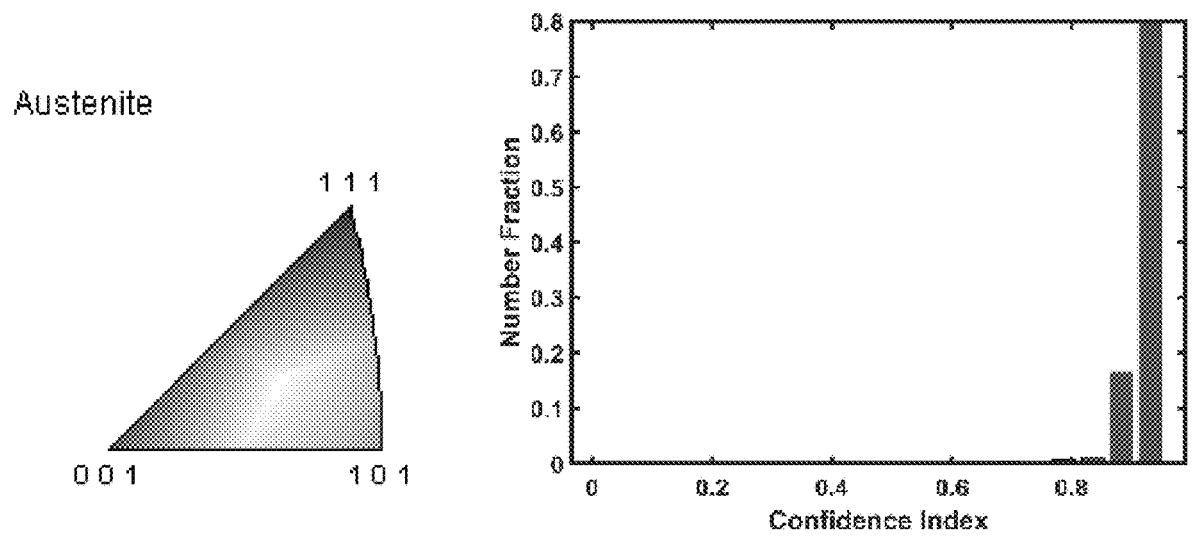
FIGS. 27 and 28 show an EBSD Map.
Figure 28:
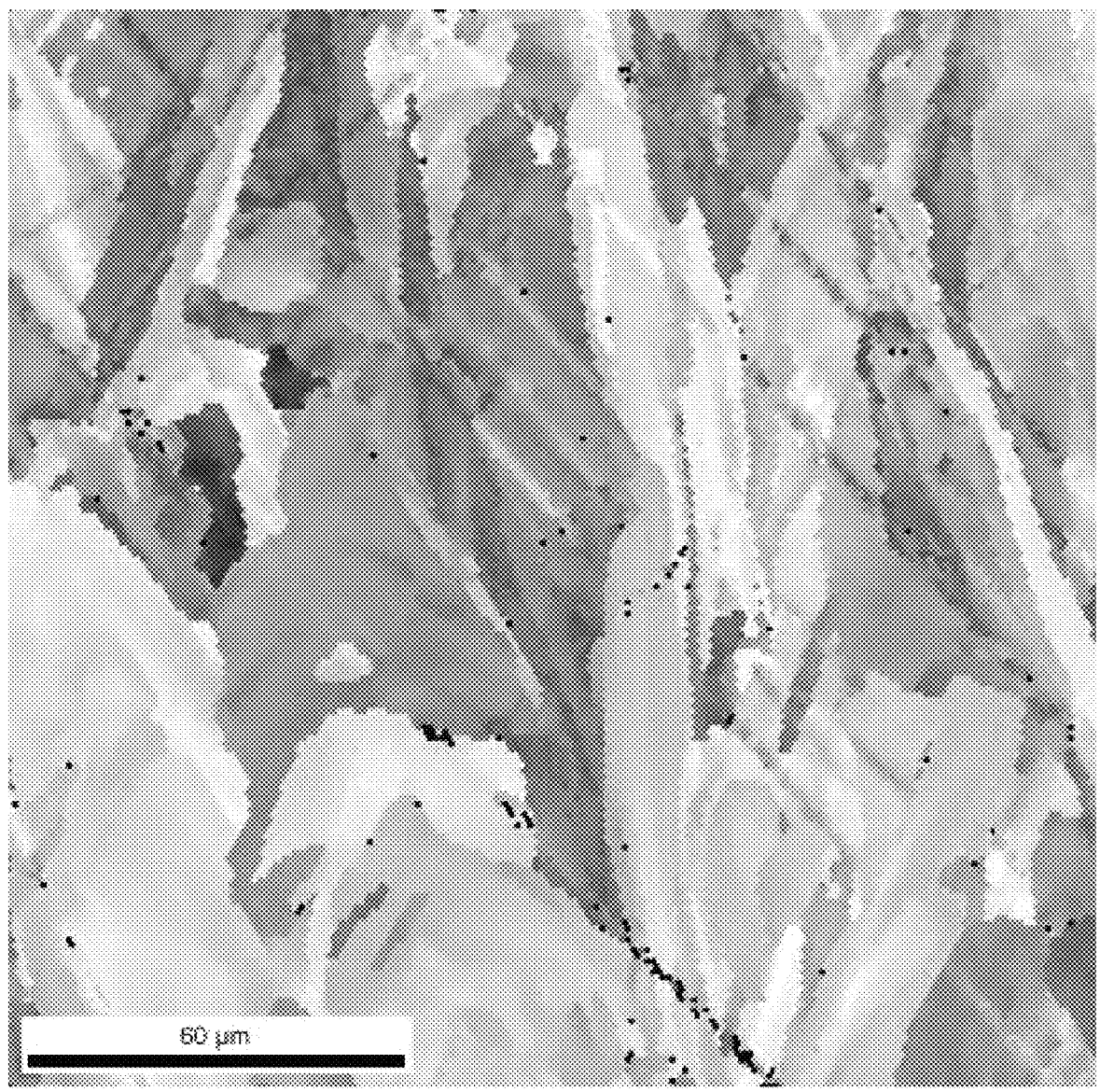

FIGS. 27 and 28 show an EBSD map made over a 175×175 μm area of one of the 316L samples using an accelerating voltage of 15 kV. The test determined that almost the entire area tested was composed of austenite. There were small sections present that were not found to be austenite, but these sections had a low confidence index. Some of these appear to be due to imperfections from polishing the sample. The concentration of alloying elements (Fe, Cr, Ni, Mo, C, Mn, Cu, P, S, Si, N, Al, Nb, V, B, Ti, Se) did not vary over the surface within the uncertainty of scanning electron microscopy energy-dispersive X-ray spectroscopy (EDS). In this EBSD map, the z-direction on the build platform is oriented vertically in the image. It can be seen from this image that colony of grains grew vertically through multiple build layers instead of being confined to individual layers, due to the colonies being longer than the layer thickness of 40 μm.

Figure 29:
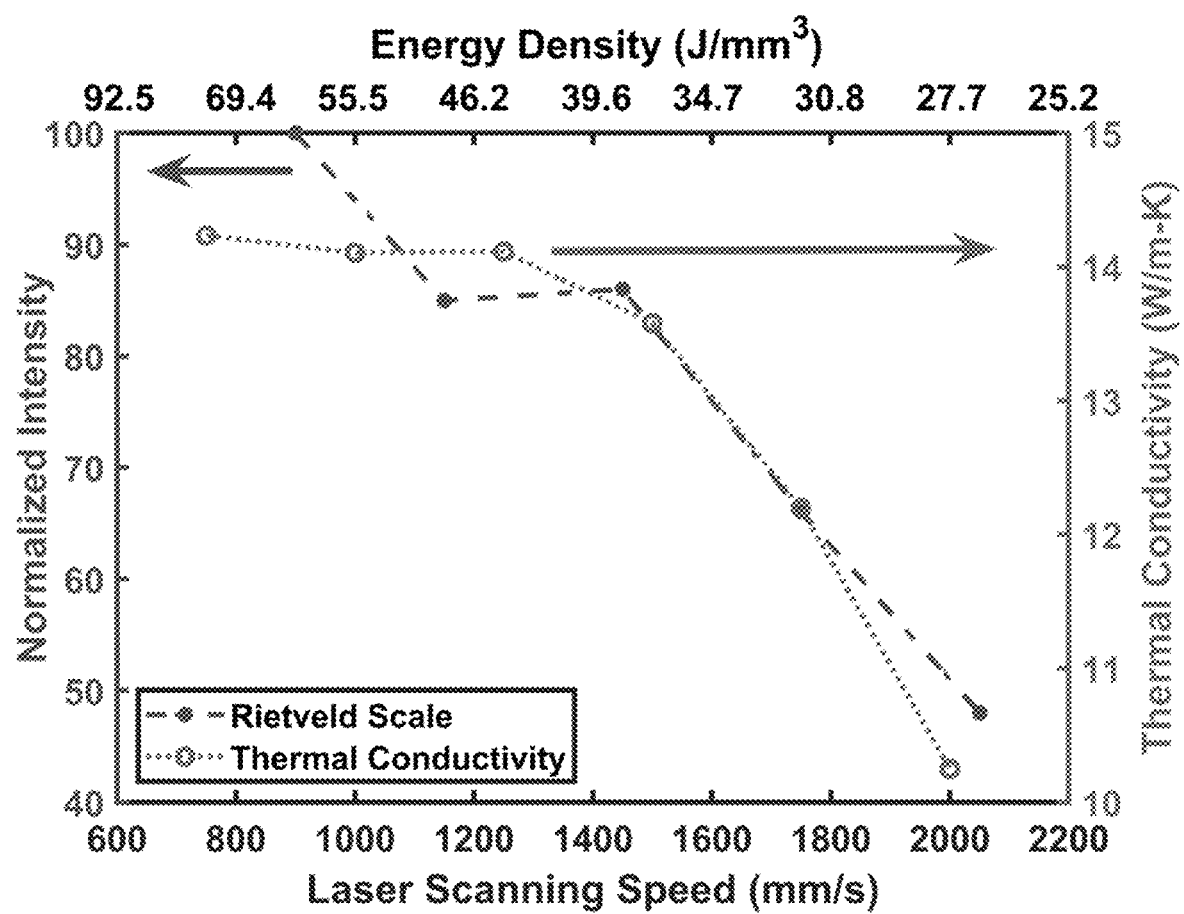
FIG. 29 shows relationship between thermal conductivity and XRD test results for 316L.

Finally, as shown in FIG. 29, an X-ray diffraction (XRD) characterization was performed on samples printed with the same process parameters as listed above, but with scanning speeds ranging from 900 mm/s to 2050 mm/s. The results show that thermal conductivity and the XRD peak intensity share the same critical laser scanning speed. Porosity does not explain this reduction in peak intensity, as voids should not scatter and reduce XRD peak intensity, as x-rays will not interact with the vacuum. This reduction in XRD intensity may be due to some fraction of the nanoscale grains having amorphous regions. TEM study showed some crystals possessing amorphous characteristics. Slower laser scanning speeds have longer thermal penetration, which exposes the previously printed layers to a greater number of rewarming cycles, thus leading to better crystallization.

The unique thermal profile of SLM changes the microstructure and alters the thermal conductivity locally. In the near-optimal processing, the variation in thermal conductivity with crystal domains stems from thermal boundary resistance between small nanoscale additive domains and their relative alignment. The EBSD results show similar structures to other studies conducted on additively manufactured 316L, which concluded that ~1 μm diameter dendritic grains cluster together in cells of dendrites with similar orientations. [59], [62]-[65], [84], [85] Meanwhile, when processing conditions have lower energy densities than ideal, the bulk thermal conductivities are below the expected thermal conductivity versus porosity effective medium model by anywhere from 3-10%. [72] The reduction below model predictions is due partly to thermal boundary resistance between layers and also due to a change in crystallinity due to the underexposure of the metal alloy. Transmission electron microscopy and X-ray diffraction experiments indicate amorphous inclusions in the SLM printed 316L. As amorphous disorder reduces mean free path of the electron carriers, thermal conductivity reductions result.

These findings also have impact in non-destructive testing for additive manufacturing. Thermal conductivity is an indirect way to interrogate the micro and nano-structure. The thermal properties can be probed by periodic interrogation of the just-printed layer using the laser-printing laser.

For scanning speeds from 750 mm/s to 1250 mm/s, the porosity remained less than 1% and the thermal conductivity was 14.1±0.8 W/m-K. After the laser scanning speed was increased past the critical value of 1250 mm/s at 200 W (energy density of 44.4 J/mm$^3$) the porosity increases rapidly. At the fastest scanning speed tested, 2000 mm/s scanning speed (energy density of 27.8 J/mm$^3$), incomplete fusion and the creation of voids occurs (a porosity of 12.8%) and the bulk thermal conductivity dropped to 10.0±0.5 W/m-K. These results show that structural properties are not the only properties effected by process parameters in additively manufacturing. If the energy density of the process is too low, the thermal conductivity can drastically reduce more than predicted by effective medium models. These results showed reduction of thermal conductivity by a third simply by changing the laser scanning speed from 1250 mm/s to 2000 mm/s.

As can be seen, the present technology can be practically applied to determine material characteristics and properties due to the relationship demonstrated between thermal conductivity and micro and nanostructure.

Hardware

Figure 30:
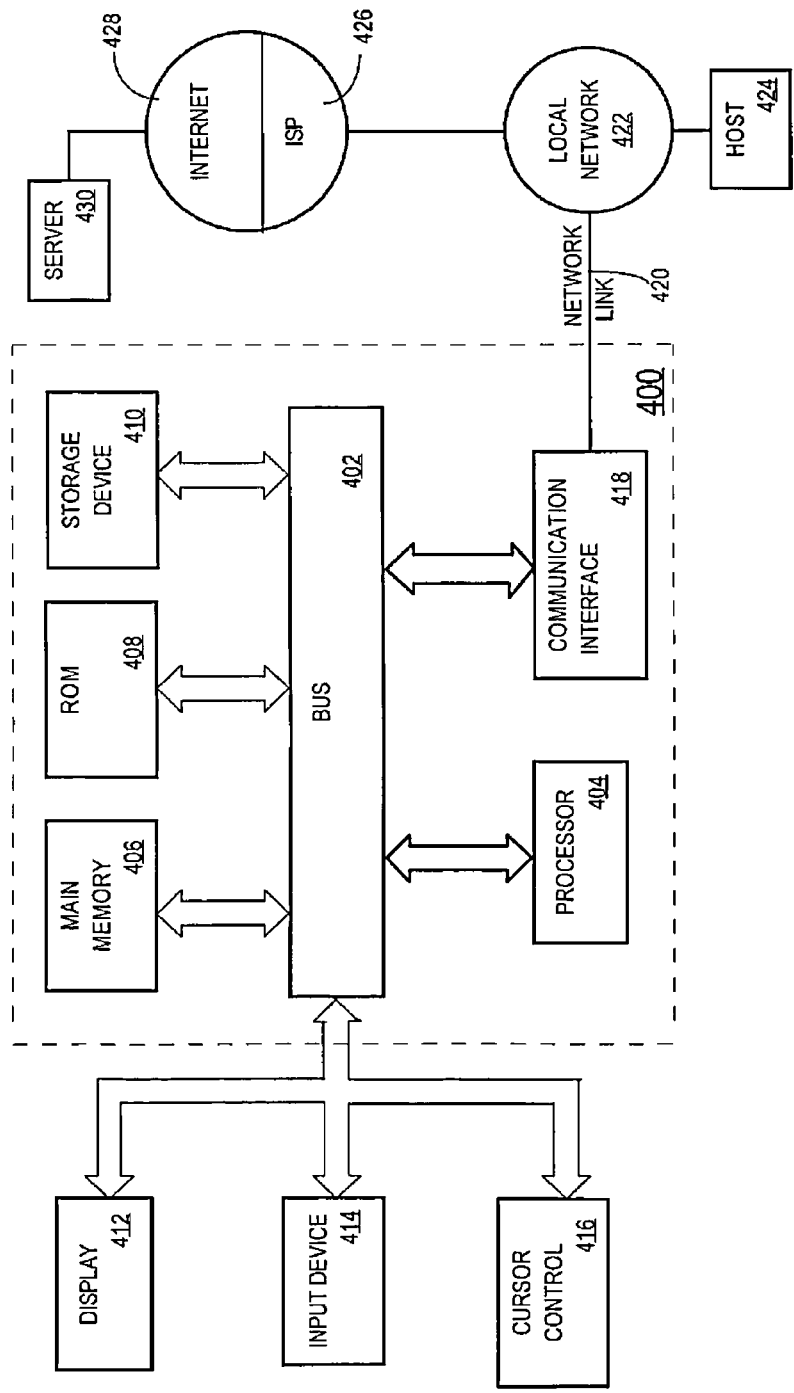
FIG. 30 shows a block diagram that illustrates a prior art computer system usable in accordance with the invention.

FIG. 30 (see U.S. Pat. No. 7,702,660, expressly incorporated herein by reference), shows a block diagram that illustrates a computer system 400, that may be used to control the additive manufacturing system. Computer system 400 includes a bus 402 or other communication mechanism for communicating information, and a processor 404 coupled with bus 402 for processing information. Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions. The computer system may also employ non-volatile memory, such as FRAM and/or MRAM.

The computer system may include a graphics processing unit (GPU), which, for example, provides a parallel processing system which is architected, for example, as a single instruction-multiple data (SIMD) processor. Such a GPU may be used to efficiently compute transforms and other readily parallelized and processed according to mainly consecutive unbranched instruction codes. [86]

While deterministic programs may be employed, machine learning systems, including neural networks, deep neural networks, and clustering algorithms, may be used to implement various aspects of the signal processing and control.

Computer system 400 may be coupled via bus 402 to a display 412, such as a liquid crystal display (LCD), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry, microcodes, or firmware may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media. Non-volatile media includes, for example, semiconductor devices, optical or magnetic disks, such as storage device 410. Volatile media includes dynamic memory, such as main memory 406. All such media are tangible to enable the instructions carried by the media to be detected by a physical mechanism that reads the instructions into a machine. Common forms of machine-readable media include, for example, hard disk (or other magnetic medium), CD-ROM, DVD-ROM (or other optical or magnetoptical medium), semiconductor memory such as RAM, PROM, EPROM, FLASH-EPROM, any other memory chip or cartridge, or any other medium from which a computer can read. Various forms of machine-readable media may be involved in carrying one or more sequences of one or more instructions to processor 404 for execution.

For example, the instructions may initially be carried on a magnetic disk of a remote computer. The remote computer can load the instructions into its dynamic memory and send the instructions over the Internet through an automated computer communication network. An interface local to computer system 400, such as an Internet router, can receive the data and communicate using an Ethernet protocol (e.g., IEEE-802.X) to a compatible receiver, and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be a local area network (LAN) card to provide a data communication connection to a compatible LAN. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world-wide packet data communication network now commonly referred to as the "Internet" 428. Local network 422 and Internet 428 may use electrical, electromagnetic or optical signals that carry digital data streams. The signals through the various networks and the signals on network link 420 and through communication interface 418, which carry the digital data to and from computer system 400.

Computer system 400 can send messages and receive data, including memory pages, memory sub-pages, and program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage device 410, or other non-volatile storage for later execution.

The computer system may be an embedded computer system of an additive manufacturing system, or a separate system, and may be located remote or local. In one embodiment, the computer system is a Raspberry Pi 3 Model B+, executing a real time operating system, such as FreeRTOS. The computer system may also be a laptop computer, e.g., an HP Z-Book 17 G5, or a workstation/server such as an HP z8 workstation.

Although the invention(s) have been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention. The invention is described by way of various embodiments and features. This disclosure is intended to encompass all consistent combinations, subcombinations, and permutations of the different options and features, as if expressly set forth herein individually.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

REFERENCES

Each reference cited herein is expressly incorporated by reference herein in its entirety.

[1] S. Kleszczynski, "Improving Process Stability of Laser Beam Melting Systems," p. 7.
[2] M. Grasso and B. M. Colosimo, "Process defects and in situ monitoring methods in metal powder bed fusion: a review," *Meas. Sci. Technol.*, vol. 28, no. 4, p. 044005, 2017, doi: 10.1088/1361-6501/aa5c4f.
[3] S. Clijsters, T. Craeghs, S. Buls, K. Kempen, and J.-P. Kruth, "In situ quality control of the selective laser melting process using a high-speed, real-time melt pool monitoring system," *Int. J. Adv. Manuf Technol.*, vol. 75, no. 5-8, pp. 1089-1101, November 2014, doi: 10.1007/s00170-014-6214-8.
[4] M. Mani, B. Lane, A. Donmez, S. Feng, S. Moylan, and R. Fesperman, "Measurement Science Needs for Real-time Control of Additive Manufacturing Powder Bed Fusion Processes," National Institute of Standards and Technology, NIST IR 8036, February 2015. doi: 10.6028/NIST.IR.8036.
[5] T. Craeghs, S. Clijsters, Jean.-P. Kruth, F. Bechmann, and Marie.-C. Ebert, "Detection of Process Failures in Layerwise Laser Melting with Optical Process Monitoring," *Phys. Procedia*, vol. 39, pp. 753-759, January 2012, doi: 10.1016/j.phpro.2012.10.097.
[6] T. Toeppel et al., "3D ANALYSIS IN LASER BEAM MELTING BASED ON REAL-TIME PROCESS MONITORING," presented at the Materials Science Technology Conference, 2016, pp. 123-132.
[7] M. A. Cheverton and J. B. D. Jr, "Systems and methods for monitoring a melt pool using a dedicated scanning device," US20150375456A1, Dec. 31, 2015.
[8] U.S. Patent and Patent Application Nos. 20190094166; 20190033135; 20180219519; 20170322084; 20160300352; 20160235304; 20160178680; 20160178583; 20150178970; 20150119661; 20150109617; 20140093490; 20140039320; 20140018649; 20130110485; 20130012819; 20120025101; 20110007166; 20100315088; 20100286525; 20100201367; 20100078576; 20090204330; 20090184259; 20090138202; 20080278794; 20080208061; 20080125643; 20080065332; 20070239036; 20070149891; 20070055175; 20060203613; 20060100666; 20050277824; 20050276504; 20050270903; 20050053305; 20040193670; 20040071363; 20030144585; 20030078503; 20030041084; 20020148978; 20010038454; 10,072,983; 9,739,663; 9,714,900; 9,563,950; 9,466,113; 9,204,862; 8,871,463; 8,861,821; 8,446,472; 8,314,406; 8,280,488; 8,274,288; 8,244,029; 8,143,897; 7,941,273; 7,912,648; 7,885,454; 7,837,623; 7,787,688; 7,755,828; 7,715,984; 7,652,764; 7,570,832; 7,515,763; 7,502,690; 7,427,269; 7,272,265; 7,260,248; 6,975,401; 6,910,060; 6,847,737; 6,798,537; 6,720,565; 6,704,110; 6,567,165; 6,453,183; 6,373,071; 6,335,792; 6,240,305; 6,236,871; 6,233,470; 6,104,946; 5,983,121; 5,963,658; 5,774,223; 5,667,300; 5,644,513; 5,456,870; 5,241,965; 5,128,541; 4,947,040; 20180156674; 20170291817; 20170279024; 20170271235; 20170219489; 20170173757; 20160133843; 20150316496; 20150241798; 20150144588; 20150110150; 20150063410; 20140231696; 20130295288; 20120327420; 20110020539; 20100315646; 20100232017; 20100219327; 20100191107; 20100191105; 20100191094; 20100191093; 20100191092; 20100191091; 20100189224; 20100189219; 20100187304; 20100051079; 20090297017; 20090245322; 20090212769; 20090084959; 20080292840; 20080226890; 20070248785; 20070230135; 20060114965; 20040183019; 20020018510; 20020011852; 10,214,833; 10,088,418; 9,950,406; 9,933,376; 9,927,350; 9,882,526; 9,825,229; 9,765,934; 9,746,435; 9,722,533; 9,477,161; 9,411,002; 9,269,880; 9,255,347; 9,171,970; 9,116,302; 8,817,260; 8,797,052; 8,541,058; 8,536,444; 8,508,370; 8,481,345; 8,408,786; 8,404,336; 8,362,431; 8,300,227; 8,299,416; 8,264,693; 8,254,524; 8,249,218; 8,222,510; 8,217,258; 8,178,153; 8,130,904; 8,116,429; 8,111,809; 8,083,406; 8,047,714; 8,041,008; 8,031,838; 7,646,486; 7,465,591; 7,379,185; 7,301,619; 7,141,440; 7,130,055; 7,098,052; 7,088,444; 7,064,822; 7,045,786; 7,026,175; 6,971,791; 6,963,393; 6,958,814; 6,940,592; 6,911,349; 6,906,801; 6,885,458; 6,812,717; 6,812,047; 6,734,960; 6,400,449; 6,343,874; 6,271,921; 6,208,421; 6,208,418; 6,175,416; 6,025,918; 5,959,735; 5,750,272; 5,748,318; 5,748,317; 5,667,300; and 5,097,357.
[9] J. Simmons, A. Azizi, M. Daeumer, and S. Schiffres, "Laser Powder Bed Fusion Processing Parameters Influence on Thermal Properties," in *Solid Freeform Fabrication Symposium*, Austin, T X, 2018, pp. 1-14.
[10] J. C. Simmons et al., "Influence of processing and microstructure on the local and bulk thermal conductivity of selective laser melted 316L stainless steel," *Addit. Manuf.*, vol. 32, p. 100996, March 2020, doi: 10.1016/j.addma.2019.100996.
[11] A. Azizi, M. A. Daeumer, and S. N. Schiffres, "Additive Laser Metal Deposition on Silicon," *Addit. Manuf.*, September 2018, doi: 10.1016/j.addma.2018.09.027.
[12] A. Feldman, "Algorithm for solutions of the thermal diffusion equation in a stratified medium with a modulated heating source," *High Temp-High Press*, vol. 31, no. 3, pp. 293-298, 1999.

[13] A. J. Schmidt, "Thermal property microscopy with frequency domain thermoreflectance and uses thereof," U.S. Pat. No. 9,927,350B2, Mar. 27, 2018.

[14] D. Cahill, "Analysis of Heat Flow in Layered Structures for Time-Domain Thermoreflectance," *Rev. Sci. Instrum.*, vol. 75, pp. 5119-5122, January 2005, doi: 10.1063/1.1819431.

[15] T. Vilaro, C. Colin, and J. D. Bartout, "As-Fabricated and Heat-Treated Microstructures of the Ti-6Al-4V Alloy Processed by Selective Laser Melting," *Metall. Mater. Trans. A*, vol. 42, no. 10, pp. 3190-3199, October 2011, doi: 10.1007/s11661-011-0731-y.

[16] C. Y. Yap et al., "Review of selective laser melting: Materials and applications," *Appl. Phys. Rev.*, vol. 2, no. 4, p. 041101, December 2015, doi: 10.1063/1.4935926.

[17] W. E. Frazier, "Metal Additive Manufacturing: A Review," *J. Mater. Eng. Perform.*, vol. 23, no. 6, pp. 1917-1928, June 2014, doi: 10.1007/s11665-014-0958-z.

[18] B. Dutta, "Additive Manufacturing by Direct Metal Deposition," p. 4.

[19] T. Kellner, "How 3D Printing Will Change Manufacturing," *GE Reports*, Nov. 13, 2017. https://www.ge.com/reports/epiphany-disruption-ge-additive-chief-explains-3d-printing-will-upend-manufacturing/(accessed Jun. 30, 2018).

[20] H. Post, "SpaceX Launches 3D-Printed Part to Space, Creates Printed Engine Chamber," SpaceX, Jul. 31, 2014. http://www.spacex.com/news/2014/07/31/spacex-launches-3d-printed-part-space-creates-printed-engine-chamber-crewed (accessed Jun. 30, 2018).

[21] H. S. Carslaw and J. C. Jaeger, "Conduction of heat in solids," *Oxf. Clarendon Press* 1959 2nd Ed, vol. 1, 1959.

[22] D. E. Bunnell, "Fundamentals of selective laser sintering of metals," Ph.D., The University of Texas at Austin, United States—Texas, 1995.

[23] P. Dumas, J. Dubarry-Barbe, D. Riviére, Y. Levy, and J. Corset, "GROWTH OF THIN ALUMINA FILM ON ALUMINIUM AT ROOM TEMPERATURE: A KINETIC AND SPECTROSCOPIC STUDY BY SURFACE PLASMON EXCITATION," *J. Phys. Colloq.*, vol. 44, no. C10, pp. C10-205-C10-208, 1983, doi: 10.1051/jphyscol:19831042.

[24] N. Cai, G. Zhou, K. Müller, and D. E. Starr, "Comparative Study of the Passivation of Al(111) by Molecular Oxygen and Water Vapor," *J. Phys. Chem. C*, vol. 117, no. 1, pp. 172-178, January 2013, doi: 10.1021/jp305740s.

[25] E. O. Olakanmi, R. F. Cochrane, and K. W. Dalgarno, "A review on selective laser sintering/melting (SLS/SLM) of aluminium alloy powders: Processing, microstructure, and properties," *Prog. Mater. Sci.*, vol. 74, pp. 401-477, October 2015, doi: 10.1016/j.pmatsci.2015.03.002.

[26] "Physical Aspects of Process Control in Selective Laser Sintering of Metals—Das—2003—Advanced Engineering Materials—Wiley Online Library." https://onlinelibrary.wiley.com/doi/abs/10.1002/adem.200310099 (accessed Mar. 17, 2018).

[27] E. Louvis, P. Fox, and C. J. Sutcliffe, "Selective laser melting of aluminium components," *J. Mater. Process. Technol.*, vol. 211, no. 2, pp. 275-284, February 2011, doi: 10.1016/j.jmatprotec.2010.09.019.

[28] M. Tang and P. C. Pistorius, "Oxides, porosity and fatigue performance of AlSi10Mg parts produced by selective laser melting," *Int. J. Fatigue*, vol. 94, pp. 192-201, January 2017, doi: 10.1016/j.ijfatigue.2016.06.002.

[29] X. Cao and J. Campbell, "Oxide inclusion defects in Al—Si—Mg cast alloys," *Can. Metall. Q.*, vol. 44, no. 4, pp. 435-449, 2005.

[30] D. L. Swift, "The thermal conductivity of spherical metal powders including the effect of an oxide coating," *Int. J. Heat Mass Transf*, vol. 9, no. 10, pp. 1061-1074, October 1966, doi: 10.1016/0017-9310(66)90028-7.

[31] M. Simonelli et al., "A Study on the Laser Spatter and the Oxidation Reactions During Selective Laser Melting of 316L Stainless Steel, Al-Si00-Mg, and Ti-6Al-4V," *Metall. Mater. Trans. A*, vol. 46, no. 9, pp. 3842-3851, September 2015, doi: 10.1007/s11661-015-2882-8.

[32] "Cahill, David G., 'Measurement of Thermal Conductivity', users.mrl.illinois.edu/cahill/thermal_school09.pdf (2009);"

[33] P. Jiang, X. Qian, and R. Yang, "Tutorial: Time-domain thermoreflectance (TDTR) for thermal property characterization of bulk and thin film materials," *J. Appl. Phys.*, vol. 124, no. 16, p. 161103, October 2018, doi: 10.1063/1.5046944.

[34] J. A. Malen, K. Baheti, T. Tong, Y. Zhao, J. A. Hudgings, and A. Majumdar, "Optical Measurement of Thermal Conductivity Using Fiber Aligned Frequency Domain Thermoreflectance," *J. Heat Transf*, vol. 133, no. 8, August 2011, doi: 10.1115/1.4003545.

[35] A. J. Schmidt, "Optical characterization of thermal transport from the nanoscale to the macroscale," Massachusetts Institute of Technology, 2008.

[36] M. R. Alkahari et al., "Thermal conductivity of metal powder and consolidated material fabricated via selective laser melting," in *Key Engineering Materials*, 2012, vol. 523, pp. 244-249, Accessed: Sep. 29, 2017. [Online]. Available: https://www.scientific.net/KEM.523-524.244.

[37] "Stainless Steel—Grade 316L (UNS 531603)," *AZoM.com*, Feb. 18, 2004. https://www.azom.com/article.aspx?ArticleID=2382 (accessed Jul. 3, 2018).

[38] J. C. Y. Koh and A. Fortini, "Prediction of thermal conductivity and electrical resistivity of porous metallic materials," *Int. J. Heat Mass Transf*, vol. 16, no. 11, pp. 2013-2022, November 1973, doi: 10.1016/0017-9310(73)90104-X.

[39] T. W. Eagar and N. S. Tsai, "Temperature Fields Produced by Traveling Distributed Heat Sources," *Weld. J.*, vol. 62, no. 12, pp. 346-s-355-s, 1983.

[40] T. L. Bergman, F. P. Incropera, L. S. Adrienne, and D. P. DeWitt, *Introduction to heat transfer*. John Wiley & Sons, 2011.

[41] S. A. Khairallah, A. T. Anderson, A. Rubenchik, and W. E. King, "Laser powder-bed fusion additive manufacturing: Physics of complex melt flow and formation mechanisms of pores, spatter, and denudation zones," *Acta Mater.*, vol. 108, pp. 36-45, April 2016, doi: 10.1016/j.actamat.2016.02.014.

[42] A. Azizi and S. N. Schiffres, "Laser Metal Additive Manufacturing on Graphite," in *Solid Freeform Fabrication Symposium*, Austin, T X, 2018, pp. 1-10.

[43] S. Ly, A. M. Rubenchik, S. A. Khairallah, G. Guss, and M. J. Matthews, "Metal vapor micro-jet controls material redistribution in laser powder bed fusion additive manufacturing," *Sci. Rep.*, vol. 7, no. 1, p. 4085, June 2017, doi: 10.1038/s41598-017-04237-z.

[44] C. B. Uvo, "Fourier and Wavelets Transforms," Lund University/LTH/Dept. Water Res. Eng, [Online]. Available: http://www.tvrl.lth.se/fileadmin/tvrl/files/vvr001f/Unit_4.pdf.

[45] A. Raj, "Lecture 5: Transforms, Fourier and Wavelets," Accessed: Apr. 15, 2020. [Online]. Available: http://www.cs.cornell.edu/courses/cs5540/2010sp/lectures/Lec5.Transforms.pdf.

[46] P. J. Olver, "Topics in Fourier Analysis: DFT & FFT, Wavelets, Laplace Transform," p. 41, 2017.

[47] G. Hariharan and K. Kannan, "Review of wavelet methods for the solution of reaction-diffusion problems in science and engineering," *Appl. Math. Model.*, vol. 38, no. 3, pp. 799-813, February 2014, doi: 10.1016/j.apm.2013.08.003.

[48] A. Jamshad, "A Comparative Study on Modifications of Decomposition Method," *Int. J. Adv. Sci. Res.*, vol. 2, no. 08, pp. 157-159, 2016.

[49] A.-M. Wazwaz and M. S. Mehanna, "The Combined Laplace-Adomian Method for Handling Singular Integral Equation of Heat Transfer," p. 5, 2010.

[50] H. Gong, "Generation and detection of defects in metallic parts fabricated by selective laser melting and electron beam melting and their effects on mechanical properties.," 2013, Accessed: Sep. 30, 2017. [Online]. Available: http://ir.library.louisville.edu/etd/515/.

[51] "The Role of Stainless Steels In industrial Heat Exchangers," Nickel Institute. https://www.nickelinstitute.org/media/1783/roleofstainlesssteelsinindustrialheatexchangers_9005_.pdf (accessed Mar. 29, 2019).

[52] P. Rodriguez, "Selection of Materials for Heat Exchangers," p. 14.

[53] H.-M. Lee, M.-C. Tsai, H.-L. Chen, and H.-Y. Li, "Stainless Steel Heat Pipe Fabrication, Performance Testing and Modeling," *Energy Procedia*, vol. 105, pp. 4745-4750, May 2017, doi: 10.1016/j.egypro.2017.03.1032.

[54] D. d O. Silva and R. R. Riehl, "Thermal behavior of water-copper and water-stainless steel heat pipes operating in cycles," in 2016 15th *IEEE Intersociety Conference on Thermal and Thermomechanical Phenomena in Electronic Systems (ITherm)*, May 2016, pp. 6-11, doi: 10.1109/ITHERM.2016.7517521.

[55] V. Brøtan, O. Å. Berg, and K. Sørby, "Additive Manufacturing for Enhanced Performance of Molds," *Procedia CIRP*, vol. 54, pp. 186-190, January 2016, doi: 10.1016/j.procir.2016.05.074.

[56] "TOOLING: How to Select the Right Tool Steel for Mold Cavities." https://www.ptonline.com/columns/tooling-how-to-select-the-right-tool-steel-for-mold-cavities (accessed Mar. 28, 2019).

[57] S. Pauly, P. Wang, U. Kühn, and K. Kosiba, "Experimental determination of cooling rates in selectively laser-melted eutectic Al-33Cu," *Addit. Manuf.*, vol. 22, pp. 753-757, August 2018, doi: 10.1016/j.addma.2018.05.034.

[58] D. Buchbinder, H. Schleifenbaum, S. Heidrich, W. Meiners, and J. Bultmann, "High Power Selective Laser Melting (HP SLM) of Aluminum Parts," *Phys. Procedia*, vol. 12, pp. 271-278, January 2011, doi: 10.1016/j.phpro.2011.03.035.

[59] Z. Sun, X. Tan, S. B. Tor, and W. Y. Yeong, "Selective laser melting of stainless steel 316L with low porosity and high build rates," *Mater. Des.*, vol. 104, pp. 197-204, August 2016, doi: 10.1016/j.matdes.2016.05.035.

[60] M. J. Matthews, G. Guss, S. A. Khairallah, A. M. Rubenchik, P. J. Depond, and W. E. King, "Denudation of metal powder layers in laser powder bed fusion processes," *Acta Mater.*, vol. 114, pp. 33-42, August 2016, doi: 10.1016/j.actamat.2016.05.017.

[61] T. Niendorf, S. Leuders, A. Riemer, H. A. Richard, T. Tröster, and D. Schwarze, "Highly Anisotropic Steel Processed by Selective Laser Melting," *Metall. Mater. Trans. B*, vol. 44, no. 4, pp. 794-796, August 2013, doi: 10.1007/s11663-013-9875-z.

[62] D. Wang, C. Song, Y. Yang, and Y. Bai, "Investigation of crystal growth mechanism during selective laser melting and mechanical property characterization of 316L stainless steel parts," *Mater. Des.*, vol. 100, pp. 291-299, June 2016, doi: 10.1016/j.matdes.2016.03.111.

[63] P. Krakhmalev, I. Yadroitsava, G. Fredriksson, and I. Yadroitsev, "Microstructure of SLM manufactured 316L and 420 grades stainless steel," *Proceeding RAPDASA 15th Annu. Int. Conf* 2014 Novemb. 6-7 Stellenbosch South Afr., pp. 59-66, January 2014.

[64] E. Liverani, S. Toschi, L. Ceschini, and A. Fortunato, "Effect of selective laser melting (SLM) process parameters on microstructure and mechanical properties of 316L austenitic stainless steel," *J. Mater. Process. Technol.*, vol. 249, pp. 255-263, November 2017, doi: 10.1016/j.jmatprotec.2017.05.042.

[65] T. Kurzynowski, K. Gruber, W. Stopyra, B. Kuźnicka, and E. Chlebus, "Correlation between process parameters, microstructure and properties of 316 L stainless steel processed by selective laser melting," *Mater. Sci. Eng. A*, vol. 718, pp. 64-73, March 2018, doi: 10.1016/j.msea.2018.01.103.

[66] X. Chen, J. Li, X. Cheng, H. Wang, and Z. Huang, "Effect of heat treatment on microstructure, mechanical and corrosion properties of austenitic stainless steel 316L using arc additive manufacturing," *Mater. Sci. Eng. A*, vol. 715, pp. 307-314, February 2018, doi: 10.1016/j.msea.2017.10.002.

[67] M. Payandeh, E. Sjölander, A. E. W. Jarfors, and M. Wessén, "Influence of microstructure and heat treatment on thermal conductivity of rheocast and liquid die cast Al-6Si-2Cu—Zn alloy," *Int. J. Cast Met. Res.*, vol. 29, no. 4, pp. 202-213, July 2016, doi: 10.1080/13640461.2015.1125990.

[68] J. K. Chen, H. Y. Hung, C. F. Wang, and N. K. Tang, "Effects of casting and heat treatment processes on the thermal conductivity of an Al—Si—Cu—Fe—Zn alloy," *Int. J. Heat Mass Transf.*, vol. 105, pp. 189-195, February 2017, doi: 10.1016/j.ijheatmasstransfer.2016.09.090.

[69] C. Y. Ho and T. K. Chu, "Electrical resistivity and thermal conductivity of nine selected AISI stainless steels," THERMOPHYSICAL AND ELECTRONIC PROPERTIES INFORMATION ANALYSIS CENTER LAFAYETTE IN, 1977.

[70] W. M. Lima et al., "The effect of porosity on thermal properties: towards a threshold of particle contact in sintered stainless steel," *J. Phys. Condens. Matter*, vol. 17, no. 7, pp. 1239-1249, February 2005, doi: 10.1088/0953-8984/17/7/016.

[71] L. C. Wei, L. E. Ehrlich, M. J. Powell-Palm, C. Montgomery, J. Beuth, and J. A. Malen, "Thermal conductivity of metal powders for powder bed additive manufacturing," *Addit. Manuf.*, vol. 21, pp. 201-208, May 2018, doi: 10.1016/j.addma.2018.02.002.

[72] J. C. Y. Koh and A. Fortini, "Thermal Conductivity and Electrical Resistivity of Porous Material." NASA, October 1971.

[73] "EOSStainlessSteel316L.pdf," EOS. https://cdn1.scrvt.com/eos/77d285f20ed6ae89/dd6850c010d3/EOSStainlessSteel316L.pdf (accessed Feb. 3, 2018).

[74] "ImageJ." https://imagej.nih.gov/ij/ (accessed Apr. 17, 2020).

[75] "Stainless Steel—Grade 316L—Properties, Fabrication and Applications (UNS S31603)," *AZoM.com*, Feb. 18, 2004. https://www.azom.com/article.aspx?ArticleID=2382 (accessed Oct. 18, 2017).

[76] "Flash Diffusivity Method: A Survey of Capabilities," Electronics Cooling, May 1, 2002. https://www.electronics-cooling.com/2002/05/flash-diffusivity-method-a-survey-of-capabilities/ (accessed Jun. 30, 2018).

[77] W. J. Parker, R. J. Jenkins, C. P. Butler, and G. L. Abbott, "Flash Method of Determining Thermal Diffusivity, Heat Capacity, and Thermal Conductivity," *J. Appl. Phys.*, vol. 32, no. 9, pp. 1679-1684, September 1961, doi: 10.1063/1.1728417.

[78] L. M. Clark III and R. E. Taylor, "Radiation loss in the flash method for thermal diffusivity," *J. Appl. Phys.*, vol. 46, no. 2, pp. 714-719, February 1975, doi: 10.1063/1.321635.

[79] V. A. Markel, "Introduction to the Maxwell Garnett approximation: tutorial," *J. Opt. Soc. Am.* A, vol. 33, no. 7, p. 1244, July 2016, doi: 10.1364/JOSAA.33.001244.

[80] J. C. Outeiro, D. Umbrello, and R. M'Saoubi, "Experimental and numerical modelling of the residual stresses induced in orthogonal cutting of AISI 316L steel," *Int. J. Mach. Tools Manuf.*, vol. 46, no. 14, pp. 1786-1794, November 2006, doi: 10.1016/j.ijmachtools.2005.11.013.

[81] L. Bodelot, L. Sabatier, E. Charkaluk, and P. Dufrénoy, "Experimental setup for fully coupled kinematic and thermal measurements at the microstructure scale of an AISI 316L steel," *Mater. Sci. Eng. A*, vol. 501, no. 1, pp. 52-60, February 2009, doi: 10.1016/j.msea.2008.09.053.

[82] J. Song, J. C. Gelin, T. Barriére, and B. Liu, "Experiments and numerical modelling of solid state sintering for 316L stainless steel components," *J. Mater. Process. Technol.*, vol. 177, no. 1, pp. 352-355, July 2006, doi: 10.1016/j.jmatprotec.2006.04.111.

[83] C. Bonnet et al., "Identification of a friction model-Application to the context of dry cutting of an AISI 316L austenitic stainless steel with a TiN coated carbide tool," *Int. J. Mach. Tools Manuf.*, vol. 48, no. 11, pp. 1211-1223, September 2008, doi: 10.1016/j.ijmachtools.2008.03.011.

[84] C. Qiu, M. A. Kindi, A. S. Aladawi, and I. A. Hatmi, "A comprehensive study on microstructure and tensile behaviour of a selectively laser melted stainless steel," *Sci. Rep.*, vol. 8, no. 1, p. 7785, May 2018, doi: 10.1038/s41598-018-26136-7.

[85] Y. M. Wang et al., "Additively manufactured hierarchical stainless steels with high strength and ductility," Nat. Mater., vol. 17, no. 1, pp. 63-71, October 2017, doi: 10.1038/nmat5021.

[86] U.S. Pat. Nos. 9,539,501; 9,544,451; 9,547,957; 9,549,253; 9,560,221; 9,563,599; 9,571,268; 9,571,270; 9,584,681; 9,589,590; 9,596,263; 9,600,237; 9,602,289; 9,607,462; 9,621,525; 9,641,541; 9,690,498; 9,698,979; 9,703,963; 9,722,777; 9,736,021; 9,747,172; 9,749,297; 9,767,271; 9,773,432; 9,778,912; 9,792,160; 9,811,671; 9,818,136; 9,818,249; 9,832,226; 9,846,814; 9,854,001; 9,892,661; 9,904,544; 9,904,579; 9,906,360; 9,906,552; 9,910,970; 9,912,472; 9,916,538; 9,917,850; 9,923,723; 9,923,923; 9,953,166; 9,954,579; 9,954,677; 9,961,050; 9,965,249; 9,971,891; 9,973,334; 9,984,255; 9,990,180; 9,996,387; 9,998,426; 10,009,171; 10,009,180; 10,019,586; 10,027,487; 10,038,640; 10,044,564; 10,061,563; 10,073,985; 10,075,384; 10,089,478; 10,142,353; 10,146,810; 10,153,895; 10,153,897; 10,158,492; 10,163,137; 10,169,571; 10,171,523; 10,194,829; 10,204,233; 10,210,346; 10,212,135; 10,212,173; 10,250,572; 10,250,589; 10,255,414; 10,263,786; 10,263,793; 10,265,994; 10,275,675; 10,277,481; 10,291,408; 10,291,411; 10,296,012; 10,296,748; 10,296,752; 10,311,442; 10,311,515; 10,320,561; 10,334,037; 10,338,913; 10,341,426; 10,356,061; 10,360,395; 10,363,657; 10,367,677; 10,374,863; 10,375,037; 10,380,362; 10,382,200; 10,388,097; 10,397,039; 10,406,687; 10,412,020; 10,427,655; 10,430,263; 10,430,598; 10,437,993; 10,438,190; 10,439,812; 10,440,121; 10,445,965; 10,447,668; 10,454,674; 10,461,923; 10,461,943; 10,467,437; 10,467,694; 10,480,947; 10,484,170; 10,484,346; 10,484,361; 10,491,536; 10,495,725; 10,504,314; 10505917; 10,509,672; 10,516,533; 10,521,496; 10,521,775; 10,523,582; 10,523,707; 10,529,041; 10529042; 10,536,167; 10,536,263; 10,540,205; 10,552,588; 10,554,634; 10,574,459; 10,585,809; 10588002; 10,594,490; 10,599,072; 10,601,787; 20170078091; 20170085441; 20170093575; 20170099272; 20170104584; 20170113664; 20170147391; 20170169737; 20170173262; 20170213028; 20170220404; 20170230179; 20170237556; 20170253069; 20170257383; 20170264620; 20170285976; 20170288856; 20170300872; 20170301033; 20170301047; 20170310478; 20170331577; 20170331670; 20170337398; 20170352012; 20170353435; 20170359316; 20170371623; 20170374027; 20180004701; 20180004702; 20180006803; 20180007032; 20180011692; 20180074790; 20180091484; 20180115587; 20180122271; 20180131507; 20180144147; 20180157487; 20180159691; 20180183601; 20180183827; 20180197007; 20180204111; 20180205747; 20180225448; 20180225661; 20180227275; 20180232502; 20180255031; 20180255445; 20180262530; 20180275565; 20180293538; 20180300487; 20180307763; 20180309567; 20180329744; 20180330109; 20180343114; 20180351941; 20180357422; 20180357434; 20180367466; 20180367467; 20180375829; 20190007207; 20190012909; 20190020629; 20190026724; 20190028273; 20190028282; 20190028283; 20190028284; 20190043050; 20190044976; 20190052617; 20190058696; 20190068562; 20190081959; 20190087594; 20190087793; 20190089687; 20190097865; 20190102569; 20190103964; 20190104121; 20190132356; 20190149317; 20190158340; 20190166030; 20190171438; 20190171612; 20190178980; 20190199692; 20190200888; 20190201691; 20190205898; 20190207757; 20190207916; 20190213359; 20190220611; 20190224441; 20190229924; 20190236879; 20190236880; 20190236881; 20190245688; 20190247662; 20190251199; 20190253237; 20190259099; 20190265645; 20190270118; 20190273619; 20190286421; 20190312854; 20190313246; 20190321583; 20190327124; 20190356482; 20190378134; 20200007459; 20200012488; 20200013251; 20200021602; 20200027096; 20200028745; 20200036523; 20200045028; 20200050430; 20200050483; 20200051062; 20200053020; 20200058019; 20200059373; 20200064444; 20200064456; 20200067913; 20200074422; 20200082362; 20200082363; 20200082364; 20200084189; 20200086078; 20200090272; 20200099658.

What is claimed is:

1. A system for measuring characteristics, comprising:
a periodically changing directed energy source having a directed energy output, incident on an object undergoing additive manufacturing, configured to excite a thermal wave which propagates in the object undergoing additive manufacturing;
a sensor configured to measure temporal and amplitude thermal response characteristics of the propagating thermal wave in at least a portion of the object undergoing additive manufacturing proximate to a directed location of the periodically changing directed energy source; and
at least one processor, configured to perform a periodic signal analysis of the measured temporal and amplitude thermal response characteristics of the propagating thermal wave, to determine presence of a manufacturing defect in the object undergoing additive manufacturing, before completion of manufacturing.

2. The system according to claim 1, wherein the periodically changing directed energy source having the directed energy output comprises a predetermined period between pulses of the directed energy source.

3. The system according to claim 1, wherein the sensor comprises a non-contact thermal sensor.

4. The system according to claim 3, wherein the non-contact thermal sensor comprises a laser directed at the portion of the object undergoing additive manufacturing.

5. The system according to claim 1, wherein the at least one processor is configured to compare the measured temporal and amplitude thermal response characteristics of the propagating thermal wave with empirically-determined reference temporal and amplitude thermal response characteristics of the propagating thermal wave.

6. The system according to claim 1, wherein the periodically changing directed energy source having the directed energy output, incident on the object undergoing additive manufacturing comprises an emitted modulated energy beam directed on the object at overlapping and incrementally varying respective locations over a plurality of cycles of modulation of the directed energy source.

7. The system according to claim 1, wherein the directed energy output of the directed energy source has a spot size of about 10μ-100 μ which translates across a surface of the object at a rate of about 1-7 m/see, and is modulated at a rate of between 10 kHz and 10 Mhz.

8. The system according to claim 1, wherein the sensor comprises a detector configured to detect a response to the directed energy output comprising a modulated directed beam comprising modulated components comprising at least two frequencies differing by a frequency ratio of at least 1.25.

9. The system according to claim 8, wherein the modulated components are generated by at least one of a direct sequence spread spectrum modulator and a chirp waveform modulator.

10. The system according to claim 1, wherein the at least one processor is further configured to determine a depth of a defect beneath a surface of the object.

11. The system according to claim 1, wherein the at least one processor is further configured to perform at least one of a Fourier transform, a wavelet transform, and a Cahill analysis of the measured thermal response, to determine presence of the manufacturing defect.

12. The system according to claim 1, wherein the at least one processor is further configured to determine the manufacturing defect based on at least a comparison of the measured temporal and amplitude thermal response characteristics of the propagating thermal wave with a corresponding measured temporal and amplitude thermal response characteristics of the propagating thermal wave within at least a portion of a known good object undergoing additive manufacturing proximate to the directed location of the directed energy source.

13. The system according to claim 1, wherein the at least one processor is further configured to adaptively learn processing conditions of a modulation of the directed energy output of the directed energy source, incident on the object undergoing additive manufacturing, that lead to formation of manufacturing defects, and producing at least one output which predicts a future manufacturing defect based on supplied processing conditions.

14. The system according to claim 1, wherein the additive manufacturing comprises fusing a powder, wherein at least a portion of the powder is recycled, and wherein the at least one automated processor is further configured to:
direct the directed energy output of the directed energy source on the powder;
measure temporal and amplitude thermal response characteristics of a propagating thermal wave in the powder dependent on a modulation of the energy output of the periodically changing directed energy source; and
analyze a fitness of the powder for manufacturing of the object by fusion of the powder based on the measured temporal and amplitude thermal response characteristics of the propagating thermal wave in the powder.

15. The system according to claim 1, wherein the additive manufacturing comprises fusing a powder; and
wherein the at least one automated processor is further configured to:
direct the directed energy output of the directed energy source on the powder;
measure temporal and amplitude thermal response characteristics of a propagating thermal wave in the powder dependent on the modulation of the directed energy output of the periodically changing directed energy source; and
analyze the measured temporal and amplitude thermal response characteristics of a propagating thermal wave in the powder to determine a set of optimal parameters for the additive manufacturing.

16. The system according to claim 1, wherein the manufacturing defect comprises a void space.

17. The system according to claim 1, wherein the at least one processor is further configured to determine a thermal conductivity of a surface of the object undergoing additive manufacturing.

18. The system according to claim 1, wherein the directed energy output is directed to the object through an optical train, having a first mode in which the directed energy output is focused for additive manufacturing, and a second mode in which the directed energy output is defocused to excite the propagating thermal wave in the at least the portion of the object undergoing additive manufacturing proximate to the directed location of the periodically changing directed energy source over time.

19. A method for measuring characteristics, comprising:
periodically changing a directed energy output of a directed energy source, incident on an object undergoing additive manufacturing to excite a thermal wave which propagates in the object undergoing additive manufacturing;
measuring temporal and amplitude thermal response characteristics of the propagating thermal wave in of at least a portion of the object undergoing additive manufacturing proximate to a directed location of the directed energy source; and analyzing the measured temporal and amplitude thermal response characteristics of the propagating thermal wave according to at least a periodic signal analysis algorithm executing on at least one processor, to determine presence of a manufacturing defect in the object undergoing additive manufacturing, before completion of manufacturing.

20. A computer readable medium having non-transitory instructions for controlling an additive manufacturing system having a modulated directed energy source having a directed energy output, incident on an object undergoing additive manufacturing, a sensor configured to measure temporal and amplitude characteristics of a propagating thermal wave excited by the directed energy output, dependent on the modulation of the directed energy output on the object undergoing additive manufacturing, and at least one processor, the non-transitory instructions comprising instructions for the at least one processor for:

receiving the measured temporal and amplitude characteristics dependent on the modulation of the energy output from the sensor, of the propagating thermal wave in at least a portion of the object undergoing additive manufacturing proximate to a directed location of the directed energy source; and at least one of:

analyzing the measured temporal and amplitude characteristics dependent on the modulation of the energy output, of the propagating thermal wave to determine presence of a manufacturing defect in the object undergoing additive manufacturing, before completion of manufacturing;

feedback controlling the directed energy source dependent on the modulation of the energy output, of the propagating thermal wave; and feedforward controlling the directed energy source dependent on the modulation of the energy output, of the propagating thermal wave.

* * * * *